(12) United States Patent
Lundvall

(10) Patent No.: US 10,222,626 B2
(45) Date of Patent: Mar. 5, 2019

(54) THIN INTEGRAL IMAGE DEVICES

(71) Applicant: ROLLING OPTICS INNOVATION AB, Solna (SE)

(72) Inventor: Axel Lundvall, Bjursås (SE)

(73) Assignee: ROLLING OPTICS INNOVATION AB, Solina (SE)

( * ) Notice: Subject to any disclaimer, the term of this patent is extended or adjusted under 35 U.S.C. 154(b) by 0 days.

(21) Appl. No.: 15/302,869

(22) PCT Filed: Mar. 31, 2015

(86) PCT No.: PCT/SE2015/050386
§ 371 (c)(1),
(2) Date: Oct. 7, 2016

(87) PCT Pub. No.: WO2015/156723
PCT Pub. Date: Oct. 15, 2015

(65) Prior Publication Data
US 2017/0031168 A1    Feb. 2, 2017

(30) Foreign Application Priority Data

Apr. 11, 2014 (SE) ........................... 1450450

(51) Int. Cl.
*B44F 1/10* (2006.01)
*G02B 3/00* (2006.01)
(Continued)

(52) U.S. Cl.
CPC ....... *G02B 27/2221* (2013.01); *B42D 25/328* (2014.10); *B42D 25/342* (2014.10);
(Continued)

(58) Field of Classification Search
CPC .............. G02B 3/0056; G02B 27/2214; G02B 3/0012; G02B 3/0062; G02B 3/005;
(Continued)

(56) References Cited

U.S. PATENT DOCUMENTS

| 7,480,100 B1 | 1/2009 | Raymond et al. |
| 2005/0180020 A1 | 8/2005 | Steenblik et al. |

(Continued)

FOREIGN PATENT DOCUMENTS

| CN | 102438838 | 5/2012 |
| CN | 103026268 | 4/2013 |

(Continued)

OTHER PUBLICATIONS

English translation of Notification of the First Office Action issued in corresponding Chinese Application No. 201580031110.7 dated Aug. 3, 2018.

*Primary Examiner* — Jade R Chwasz
(74) *Attorney, Agent, or Firm* — Birch, Stewart, Kolasch & Birch, LLP

(57) ABSTRACT

An integral image device (1) comprises an array (20) of focusing micro-lenses (22), optionally a reflecting layer (40) and an image fragment plane (30). The reflecting layer is positioned on a same side of the array of focusing micro-lenses as a focal plane of the focusing micro-lenses as such. The reflecting layer is arranged for reflecting at least a part of light incident on a surface (49) of the reflecting layer facing the array of focusing micro-lenses. The image fragment plane has image fragment structures (32). The array of focusing micro-lenses is positioned between the reflecting layer and the image fragment plane. The image fragment plane is arranged to, when being viewed refracted through the array of focusing micro-lenses towards the reflecting layer, reflected by the reflecting layer and refracted back through the array of focusing micro-lenses from the reflecting layer, give rise to an integral image.

20 Claims, 16 Drawing Sheets

(51) Int. Cl.
*G02B 27/22* (2018.01)
*G06K 19/16* (2006.01)
*B42D 25/328* (2014.01)
*B42D 25/342* (2014.01)
*B42D 25/351* (2014.01)
*B42D 25/425* (2014.01)

(52) U.S. Cl.
CPC ......... *B42D 25/351* (2014.10); *B42D 25/425* (2014.10); *B44F 1/10* (2013.01); *G02B 3/0056* (2013.01); *G06K 19/16* (2013.01)

(58) Field of Classification Search
CPC ............ G02B 19/0028; G02B 27/2221; B42D 25/328; B42D 25/351; B42D 25/324; B42D 25/342; B42D 25/425; B44F 1/10; G06K 19/16
USPC .................................. 359/479, 478, 462, 463
See application file for complete search history.

(56) References Cited

U.S. PATENT DOCUMENTS

| | | |
|---|---|---|
| 2009/0102179 A1 | 4/2009 | Lo |
| 2010/0014313 A1 | 1/2010 | Tillin et al. |
| 2010/0277806 A1 | 11/2010 | Lundvall |
| 2011/0122499 A1 | 5/2011 | Commander et al. |
| 2011/0222152 A1 | 9/2011 | Lundvall |
| 2012/0120488 A1 | 5/2012 | Lee |
| 2013/0069360 A1 | 3/2013 | Power et al. |
| 2014/0247499 A1* | 9/2014 | Doublet ............... G02B 3/0037 359/627 |
| 2014/0347628 A1 | 11/2014 | Martinez Corral et al. |

FOREIGN PATENT DOCUMENTS

| | | |
|---|---|---|
| DE | 102007053810 A1 | 5/2009 |
| DE | 10 2009 022 612 A1 | 12/2010 |
| EP | 2333727 A2 | 6/2011 |
| EP | 2335943 A2 | 6/2011 |
| GB | 2488795 A | 9/2012 |
| GB | 2490780 A | 11/2012 |
| WO | WO 00/22468 A1 | 4/2000 |
| WO | WO 2011/102800 A1 | 8/2011 |
| WO | WO 2011/162695 A1 | 12/2011 |
| WO | WO 2013/057352 A1 | 4/2013 |

* cited by examiner

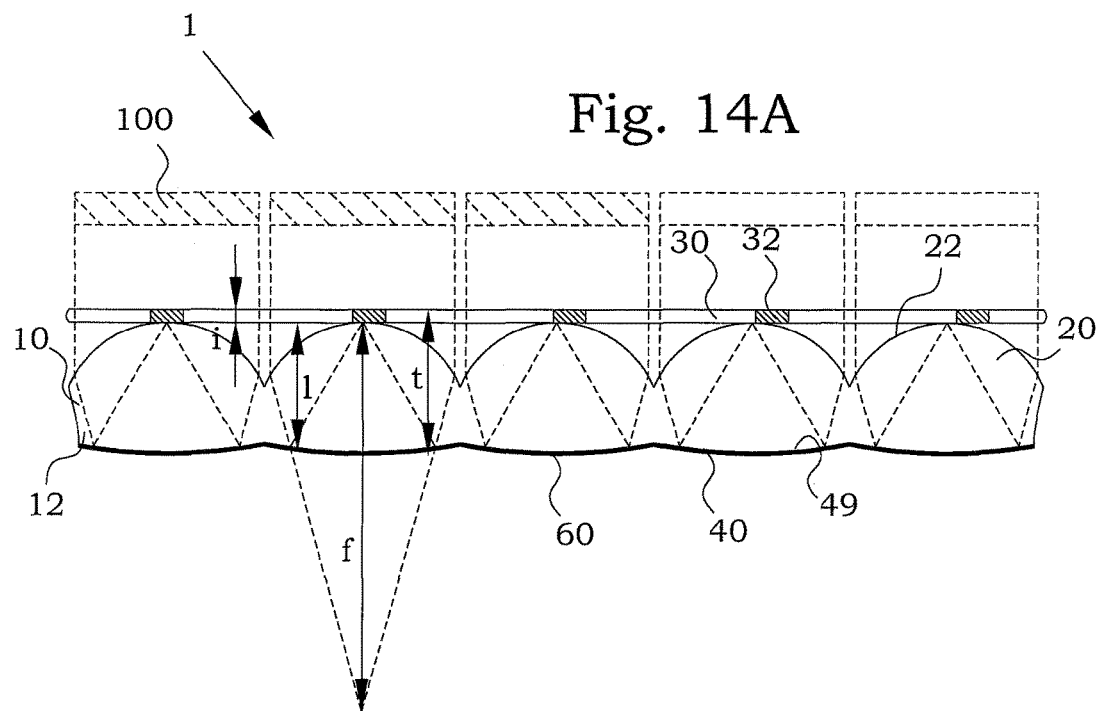
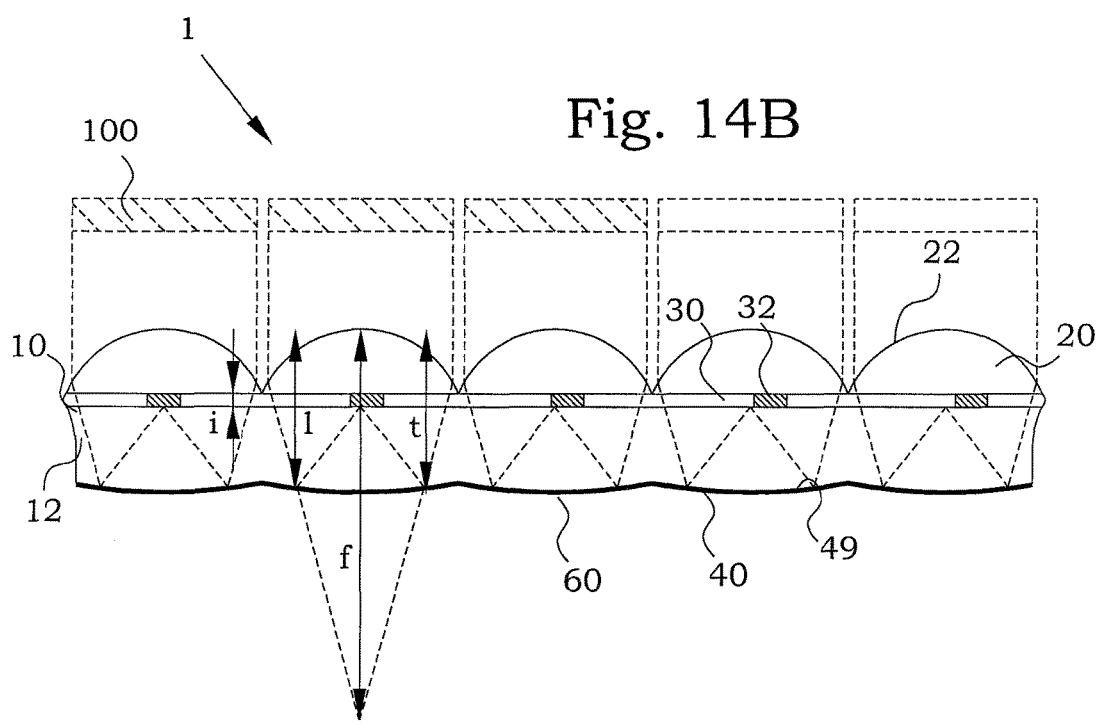

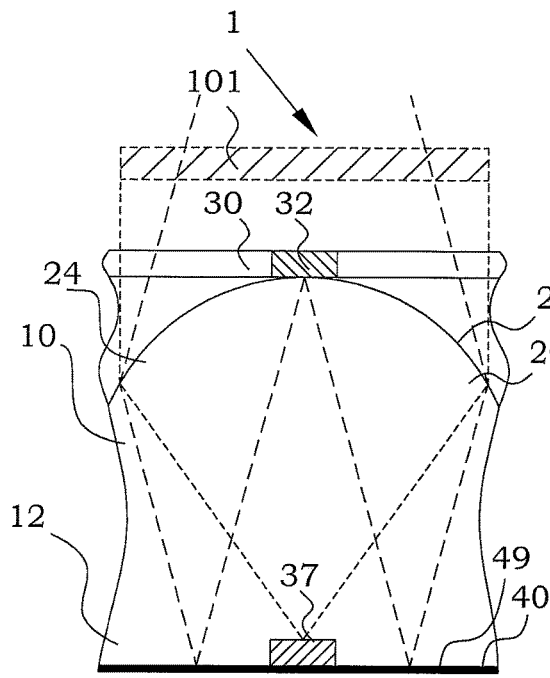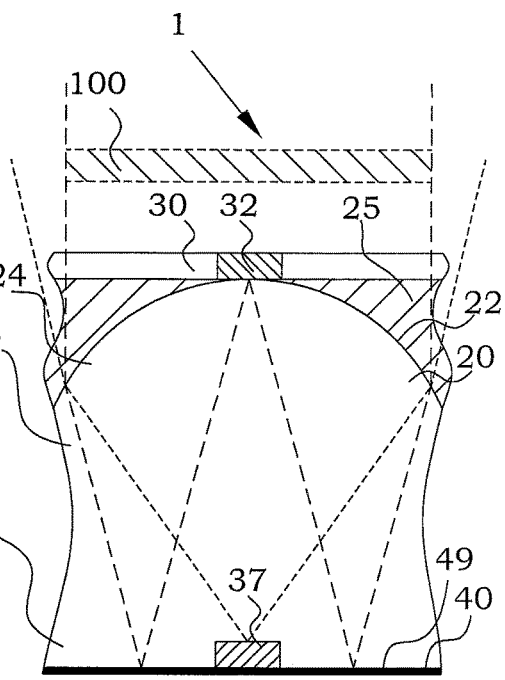
Fig. 20A    Fig. 20B
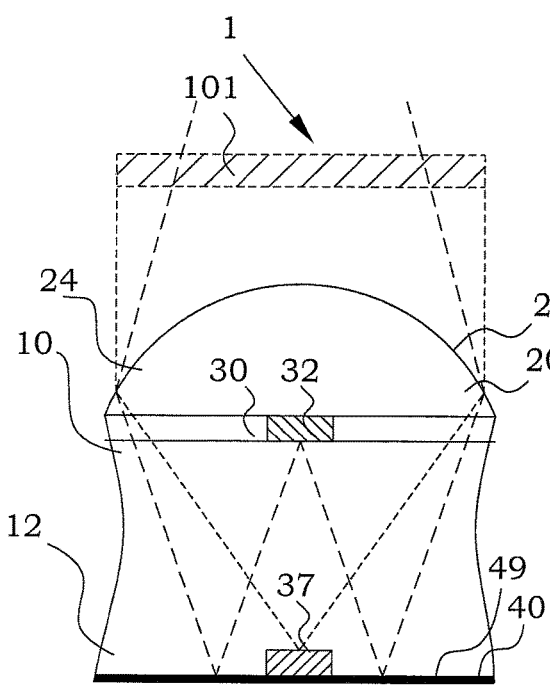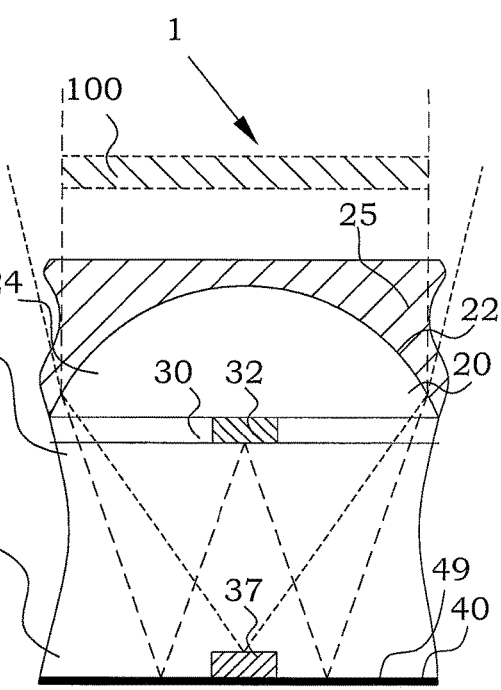
Fig. 20C    Fig. 20D

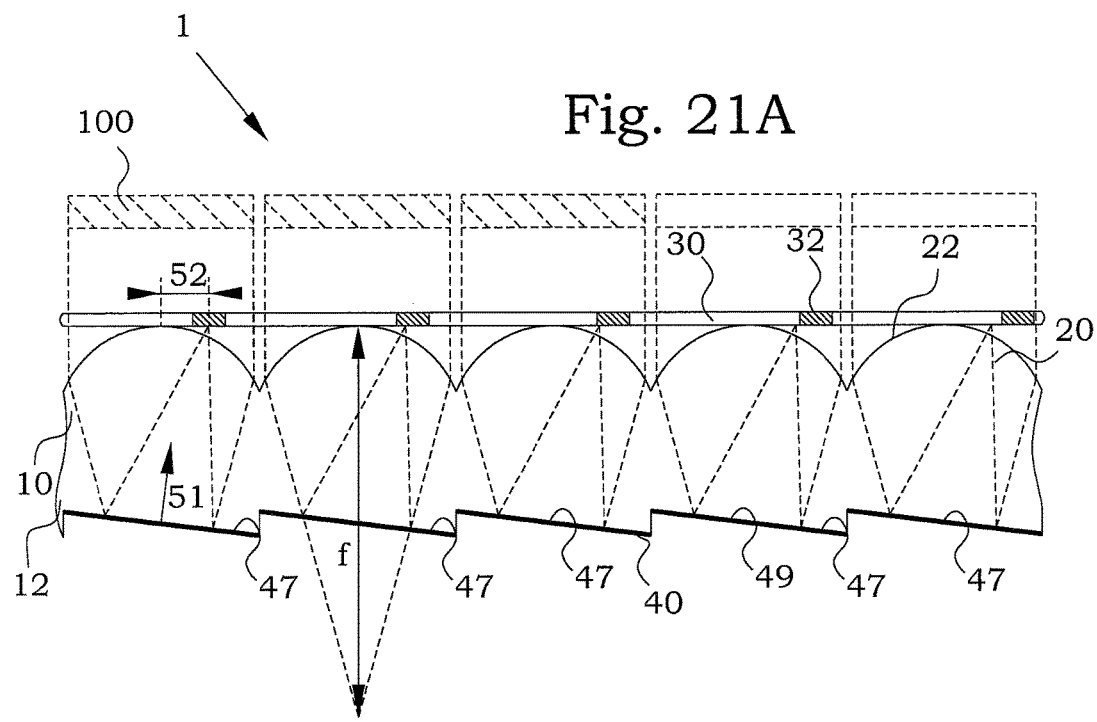
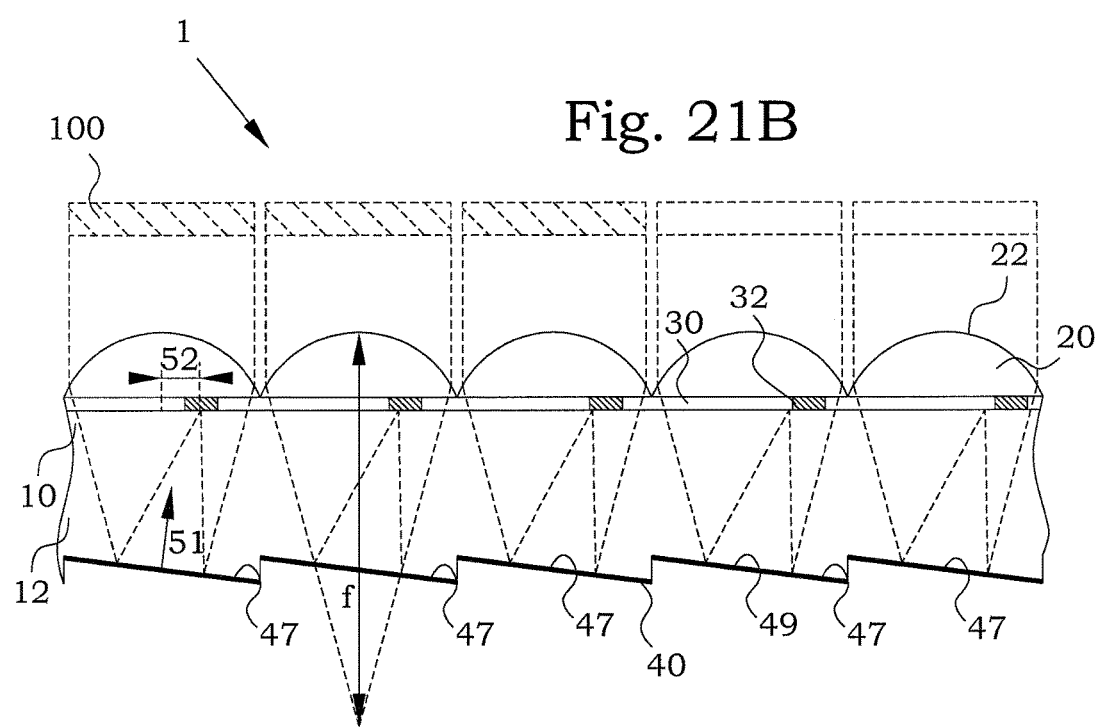

THIN INTEGRAL IMAGE DEVICES

TECHNICAL FIELD

The proposed technology generally relates to synthetic image devices, and in general to devices where a synthetic image is formed by the cooperation of a multitude of micro-lenses.

BACKGROUND

The field of integral images has developed fast during the last years. Integral image devices are today used for creating eye-catching visual effects for many different purposes, e.g. as security markings, tamper indications or simply as esthetic images. Usually, the integral image device is intended to be provided as a label or as an integrated part in another device. Many different optical effects have been discovered and used and often different optical effects are combined to give a certain requested visual appearance. At the same time, it is a general request to keep the integral image device as thin as possible, in order to facilitate the integration into e.g. other sheet materials.

The typical approach for an integral image device is to provide an array of small focusing element. The focusing element may be different kinds of lenses, apertures or reflectors. An image fragment plane is provided with image fragment structures. The image fragment plane is provided relative to the array of focusing elements such that when the device is viewed from different angles, different parts of the image fragments structures are enlarged by the focusing elements and together form an integral image. Depending on the design of the image fragment structures, the integral image can change in different ways when the viewing conditions, e.g. viewing angles, are changed.

A typical realization of an integral image device is a thin polymer foil, where focusing elements and image fragment structures are created in different planes.

In the published European patent application EP2335943, the use of a reflective layer within the foil of an integral image device is disclosed. The image fragment structures are provided directly below the array of micro-lenses and the reflective layer faces the image fragment structures and the micro-lenses from below. The image fragment structures are seen by a viewer as an image reflected in the reflective layer and refracted in the micro-lenses. The optical length between the micro-lenses and the image fragment structures should typically be in the vicinity of a focal length of the micro-lenses in order to give an integral image. In such a design, the optical path is about double the distance between the bottom part of the micro-lenses and the reflective layer. In this way, the total thickness of the integral image device can be reduced.

However, since more elaborate optical designs typically requires additional layers and thereby increase the thickness of the integral image device, there is still a need to further reduce the device thickness.

SUMMARY

It is an object to provide integral image devices with very small thicknesses.

This and other objects are met by embodiments of the proposed technology. In general words, according to a first aspect, there is provided an integral image device. The integral image device comprises an array of focusing micro-lenses and an image fragment plane. The array of focusing micro-lenses, as such, has a focal plane. The image fragment plane has image fragment structures. The image fragment plane is positioned on an opposite side of the array of focusing micro-lenses with respect to the focal plane. The image fragment plane is arranged to, when being viewed refracted through the array of focusing micro-lenses away from a viewer, reflected back and refracted back through the array of focusing micro-lenses towards the viewer, give rise to an integral image.

According to a second aspect, there is provided a method for manufacturing an integral image device. The method comprises providing of a thin, at least partly optically transmissive, substrate. An array of focusing micro-lenses is created at a first surface of the substrate. An image fragment plane with image fragment structures is provided on top of the array of focusing micro-lenses. The providing of the image fragment plane comprises arranging of the image fragment plane with image fragment structures to, when being viewed refracted through the array of focusing micro-lenses away from a viewer, reflected and refracted back through the array of focusing micro-lenses towards the viewer, give rise to an integral image.

An advantage of the proposed technology is that the thickness of the integral image device is utilized for focusing purposes in an optimum manner. Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 14A is a schematic drawing of an embodiment of an integral image device with a curved reflective layer;

FIG. 14B is a schematic drawing of an example of an integral image device with a curved reflective layer;

FIGS. 20A-D are schematic drawings of other embodiments of an integral image device with two image fragment planes; and FIGS. 21A-B are schematic drawings of other embodiments of an integral image device with tilted reflection layers.

DETAILED DESCRIPTION

Throughout the drawings, the same reference designations are used for similar or corresponding elements.

For a better understanding of the proposed technology, it may be useful to begin with a brief overview of a standard integral image device.

In the present disclosure, the term "integral image device" is used to denote a device, which by means of a multitude of small focusing elements, for a certain view angle selects parts of a corresponding image plane as a "part image" and presents them for the viewer in such a way that the viewer's brain composes a total "integral" image from the part images. The term "integral image device" thus comprises devices where each focusing element has its corresponding cell area in an image fragment plane, and where the content in each cell of the image fragment plane is adapted to present a suitable part image for a certain angle of view.

The term "integral image device" also comprises the traditional moiré images, which in fact is a special version of the general integral image device. In a moiré image, the image comprises repeated identical part images, which results in an image fragment plane consisting of cell in which a miniaturized version of the repeated part image is successively moved a minor distance compared with a neighboring cell. When a portion of the part image passes the "cell boundary", a corresponding portion will appear in the next cell. The apparent design of a moiré image fragment plane thus becomes an array of regularly spaced miniaturized versions of the intended final image having a pitch that differs from the pitch of the focusing elements by a small fraction. Hence the moiré image represents a cyclic repeating integral image.

The terms "image fragment plane" and "image fragment structures" should in the present disclosure be interpreted as also comprising the cases where the "fragment" is the entire image.

Integral image devices are in some places in prior art also denoted as "synthetic image device".

Figure 1A:
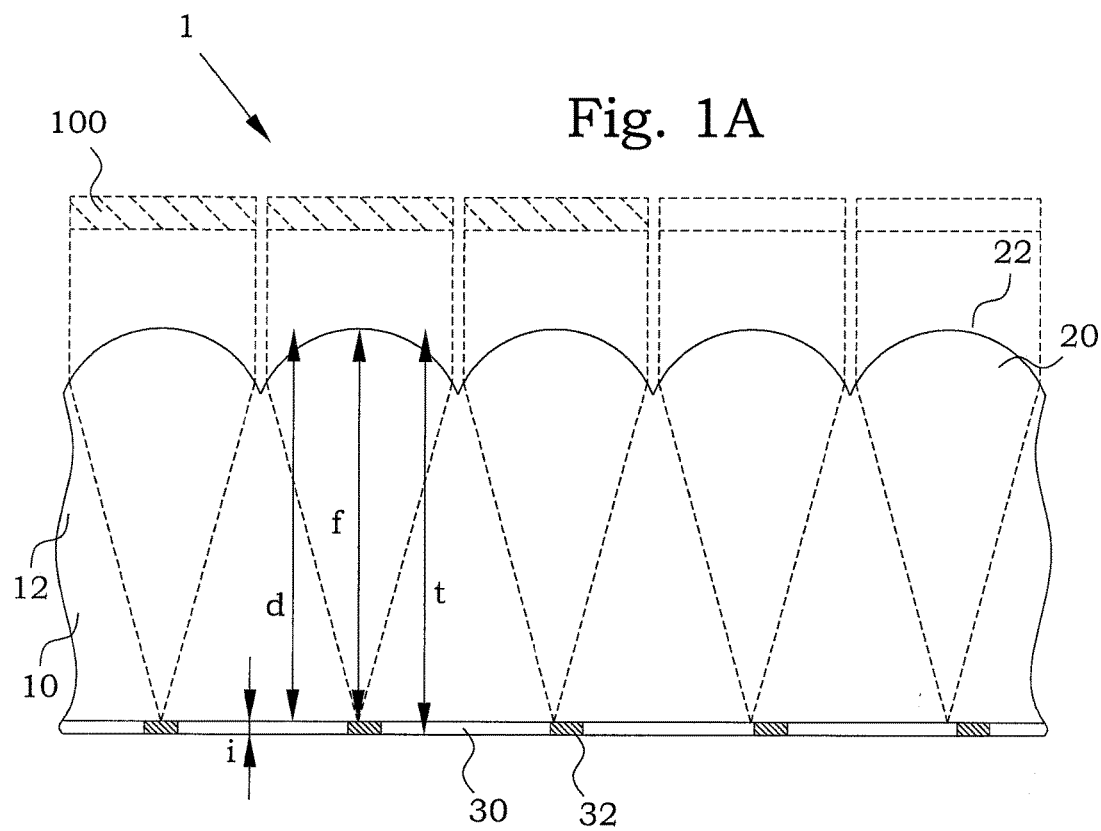
FIG. 1A and FIG. 1B are schematic drawings of an example of an integral image device at different viewing angles.
Figure 1B:
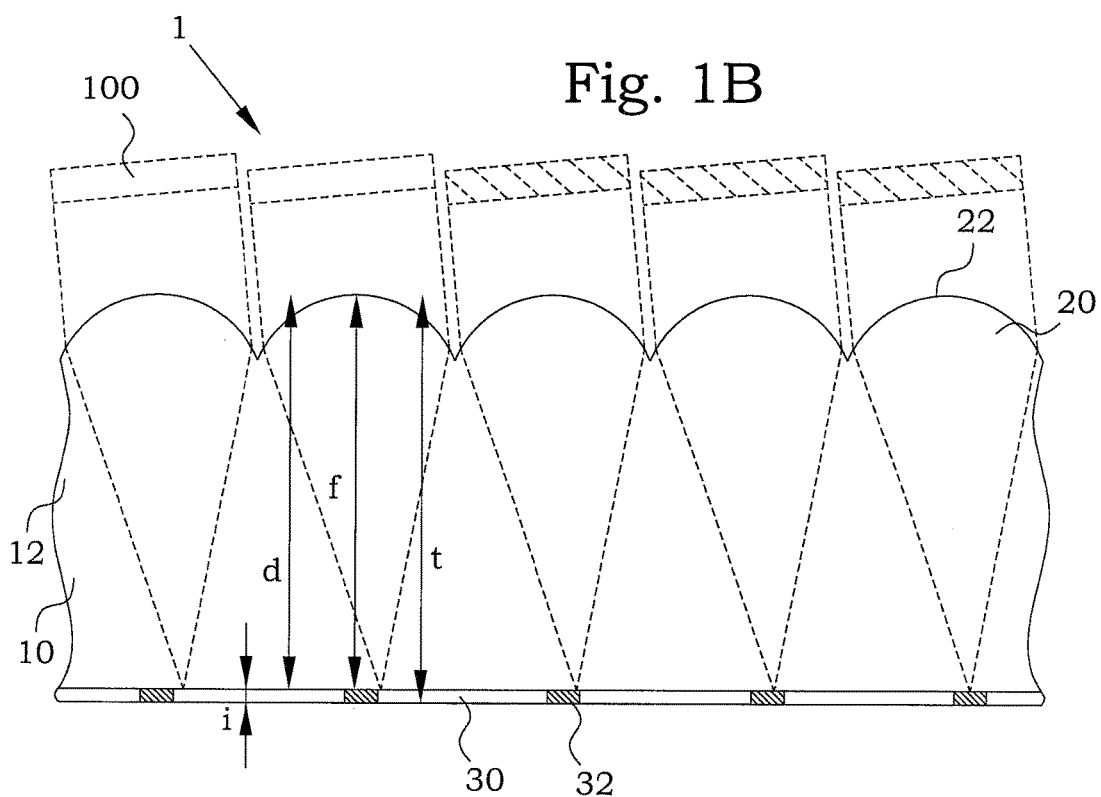

FIGS. 1A and 1B illustrate a typical example of an integral image device 1. An integral image device as illustrated in FIGS. 1A-B is well known in prior art, and is well suited to explain the basic principles of creating an integral image. An array 20 of focusing micro-lenses 22 is provided. The focusing micro-lenses define as such a focal plane. The array 20 is typically provided as, in or on the top surface of a thin, at least partly optically transmissive, substrate 10, typically a substrate polymer foil 12. An image fragment plane 30 with image fragment structures 32 is provided at a distance d from the focusing micro-lenses 22. Typically, the image fragment plane 30 is provided as, in or on the bottom surface of the substrate 10. However, in alternative examples, the substrate may be exchanged or combined with other type of spacer components, determining a well-defined distance between the focusing micro-lenses 22 and the image fragment plane 30. The distance d is in most applications in the vicinity of the focus length f of the focusing micro-lenses 22, but not necessarily exact matching. A thickness t of the total integral image device 1 becomes in this example equal to the sum of the distance d and the thickness i of the image fragment plane 30.

In FIG. 1A, some light paths through the integral image device 1 are indicated in order to explain the function of the integral image device 1. Light emitted, reflected or transmitted from a limited area of the image fragment plane 30 is refracted by the micro-lenses to form an essentially parallel bundle of light rays. If the limited area is a part of an image fragment structure 32, this part of the image fragment structure 32 is enlarged and covers the area of the micro-lens. A viewer will notice these enlarged versions of the parts of the image fragment structures and the brain of the viewer will combine the integral image composed by the individual focusing micro-lens images into one continuous image. In other words, the image fragment plane is arranged to, when being viewed refracted through the array of focusing micro-lenses, give rise to an integral image 100. In FIG. 1A, it is illustrated that when the angle of view is straight from the front, the two micro-lenses at the right side do not provide any enlarged structure image, since the imaged area falls outside the respective image fragment structure 32.

FIG. 1B illustrates the situation when the integral image device is viewed from another angle. In this example, the part of the image fragment plane 30 that is enlarged by the focusing micro-lenses 22 are somewhat displaced. This means that the two focusing micro-lenses situated at the left side will have no image fragment structure 32 to enlarge, whereas the two right side focusing micro-lenses instead create images of image fragment structures 32. In such a way, an image that changes with viewing angle can be constructed.

The design of the image fragment structure 32 in the image fragment plane 30 depends on the actual optical effects that are requested for the integral image. Numerous variations are known, as such, in prior art, and the person skilled in the art knows how to make such designs, once the optical and geometrical relations between the image fragment plane 30 and the focusing micro-lenses 22 are known.

Figure 2:
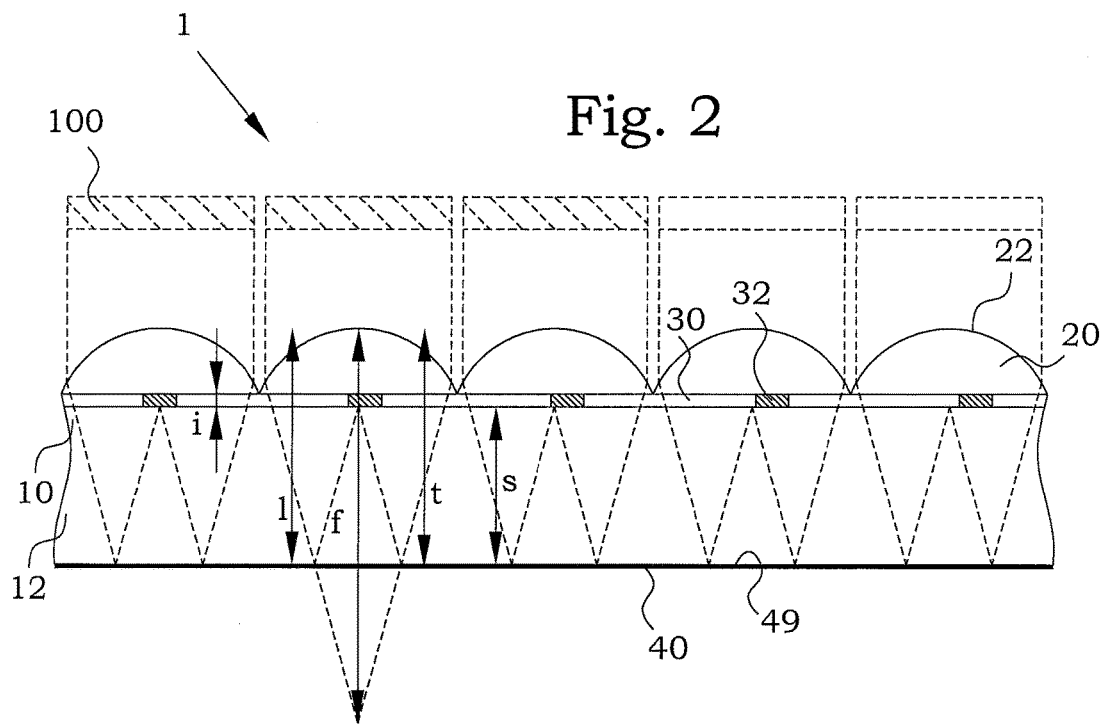
FIG. 2 is a schematic drawing of another example of an integral image device.

Another example of an integral image device 1, that is known in prior art, is illustrated in FIG. 2. In this example, the image fragment plane 30 is provided directly below the focusing micro-lenses 22. Instead, there is a reflecting layer 40 provided at a distance s from below the image fragment plane 30. The reflecting layer 40 is positioned on a same side 29 of the array of focusing micro-lenses 20 as the focal plane. The reflecting layer 40 is arranged for reflecting at least a part of light incident on a surface 49 of the reflecting layer 40 facing the array of focusing micro-lenses 20. The distance s is selected so that the sum of a distance 1 between the focusing micro-lenses 22 and the reflecting layer 40 and the distance s becomes close to the focal length f of the focusing micro-lenses 22. Areas of the image fragment plane 30 are now enlarged by the corresponding focusing micro-lenses 22 by reflection in the reflecting layer 40. In other words, the image fragment plane 30 is arranged to, when being viewed reflected by the reflecting layer 40 and refracted through the array of focusing micro-lenses 20 from the reflecting layer, give rise to an integral image. The thickness t of the integral image device becomes equal to the sum of the distance 1 and the thickness of the reflecting layer 40, which typically can be neglected. Such a thickness is typically much less than for a corresponding device according to the examples of FIGS. 1A-B. Typically, thickness reductions of 30-40% are not unreasonable.

Figure 3:
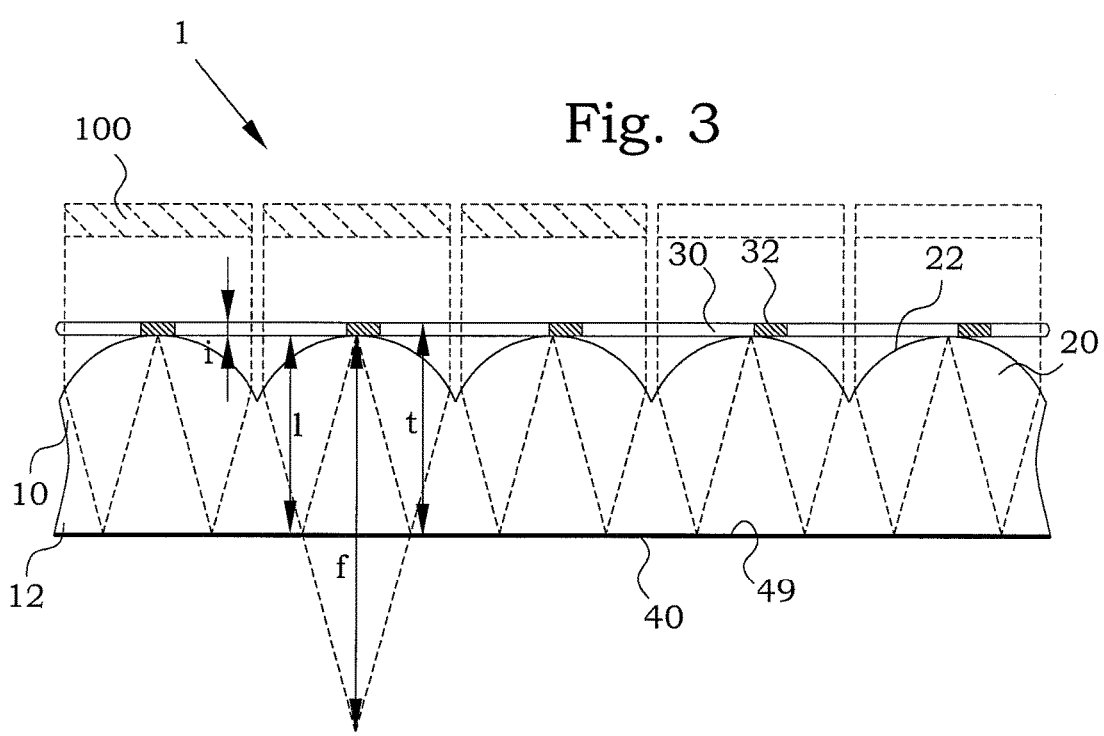
FIG. 3 is a schematic drawing of an embodiment of an integral image device with an image fragment plane on top of an array of focusing micro-lenses.

FIG. 3 illustrates an embodiment of an integral image device 1. The integral image device 1 comprises an array 20 of focusing micro-lenses 22. The integral image device 1 also comprises a reflecting layer 40 being positioned on a same side 29 of the array 20 of focusing micro-lenses 22 as the focal plane of the focusing micro-lenses 22 as such. In other words, the reflecting layer 40 is positioned on the side of the array 20 of focusing micro-lenses 22 at which incident, originally parallel, light is forced to converge by the action of the micro-lenses 20. With reference to the figure, the reflecting layer 40 is thus positioned beneath the array 20 of focusing micro-lenses 22. It can also be expressed as that the reflecting layer 40 is positioned on the opposite side of the array 20 of focusing micro-lenses 22 with respect to the intended viewer. The reflecting layer 40 is arranged for reflecting at least a part of light incident on a surface 49 of the reflecting layer 40 facing the array 20 of focusing micro-lenses 22. The Integral image device further comprises an image fragment plane 30 with image fragment structures 32. Unlike previously discussed devices, the array 20 of focusing micro-lenses 22 is positioned between the reflecting layer 40 and the image fragment plane 30. In other words, the image fragment plane is placed on top of the array 20 of focusing micro-lenses 22. The areas of the image fragment plane 30 that is to be enlarged by the array 20 of focusing micro-lenses 22 are seen as a reflection in the reflecting layer 40 and after an additional refraction in the array 20 of focusing micro-lenses 22. In other words, the image fragment plane 30 is arranged to, when being viewed refracted through the array 20 of focusing micro-lenses 22 towards the reflecting layer 40, reflected by the reflecting layer 40 and refracted back through the array 20 of focusing micro-lenses 22 from the reflecting layer 40, give rise to an integral image. The rays from the image fragment plane 30 that reaches the eyes of a viewer thereby passes the array 20 of focusing micro-lenses 22 twice, one in each direction, separated by a reflection in the reflecting layer 40.

The distance 1 from the array 20 of focusing micro-lenses 22 to the reflecting layer 40 is now utilized two times during the focusing process. The focusing micro-lenses 22, as such, have a focal plane behind the reflecting layer 40. However, by the composed action of the focusing micro-lenses 22 and the reflecting layer 40, the focal plane of the composed aggregate is moved to the other side of the focusing micro-lenses 22. This means that the distance 1 should be essentially equal to the focal length f of the focusing micro-lenses 22. (As discussed in prior art integral image device literature, the distance 1 does not necessarily be exactly equal to the focal length, and in some cases a slightly differing length l is selected on purpose to achieve "optimum" imaging properties. However, anyone skilled in the art has such a knowledge.) The total thickness of the integral image device t thereby becomes equal to the sum of the distance 1, the thickness i of the image fragment plane 30 and the thickness of the reflecting layer 40, which typically can be neglected. This thickness is typically even smaller than the thickness of corresponding devices according to the example given here above.

By utilizing the thickness of the material of the focusing micro-lenses 22 themselves twice, the total thickness of the device can be made very small. Since the typical thickness of the image fragment plane 30 is much smaller than the structural depth of the focusing micro-lenses 22, the advantage of using also the structural depth of the focusing micro-lenses 22 far compensates for the additional thickness added by the image fragment plane 30 placed on top of the array 20 of focusing micro-lenses 22. The total thickness of an integral image device according to FIG. 3 will be in the order of 50% compared to an integral image device according to FIGS. 1A-B.

The reflecting layer 40 of e.g. FIGS. 2 and 3 does not have to be fully reflecting. As long as the reflected intensity is at least comparable with the background light, an integral image corresponding to the image fragment plane 30 may be perceivable. In one embodiment, the reflecting layer 40 could even be implemented by the backside of the substrate 10 itself. Since there normally is a difference in refractive index between such a substrate and the material behind it, some light will be reflected in such an interface. By placing the backside of the substrate against a dark surface, preventing transmitted light and allowing a minimal gap of air or other media with low refractive index in between, the background light can be limited sufficiently for the integral image to be perceivable.

Similarly, the reflecting layer does not have to be an integrated part in the device. By having a transparent backside and placing that backside temporarily on a reflecting surface, the same effect will be achieved, making the integral image to be perceivable.

In other words, the simplest form of an integral image device (1) according to the principles of FIG. 3, would comprise an array (20) of focusing micro-lenses (22), which array (20) of focusing micro-lenses (22), as such, has a focal plane. The integral image device (1) further comprises an image fragment plane (30) with image fragment structures (35). The image fragment plane (30) is positioned on an opposite side of the array (20) of focusing micro-lenses (22) with respect to the focal plane. In other words, the image fragment plane (30) is placed on top of the focusing micro-lenses (22), between the focusing micro-lenses (22) and a viewer. The image fragment plane (30) is arranged to, when being viewed refracted through the array (20) of focusing micro-lenses (22) away from the viewer, reflected back and refracted back through the array (20) of focusing micro-lenses (22) towards the viewer, give rise to an integral image (100).

The viewer is thus intended to be viewing the integral image device from an opposite side of the array (20) of focusing micro-lenses (22) with respect to the focal plane, i.e. on the same side of the array (20) of focusing micro-lenses (22) as the image fragment plane (30).

Such a device can easily be utilized as a security or authentication device, e.g. in currency, identification documents, credit cards, brand labels, etc. One example could be an integral image device with an essentially transparent backside. When the integral image device is held in the air, the device will typically have a general light grey tone. However, if the integral image device is held against a light absorbing surface, the amount of light being transmitted through the backside of the substrate towards the view is reduced significantly, and a weak integral image can be perceived. The effect will be even more pronounced if the backside of the integral image device is held firmly against a highly reflecting surface. The external reflecting surface will act as reflecting layer and provide reflected light being composed by the focusing micro-lenses into an integral image. FIGS. 2 and 3 could also be interpreted as illustrating such a situation, where the reflecting layer is not permanently attached to the integral image device.

In a further embodiment, the thickness of the substrate of the integral image device could be manufactured to be thinner than half the focal length of the micro-lenses. Instead, the reflecting surface onto which the integral image device is to be pressed when the integral image is to be detected could be covered by a transparent material that compensates for the "lacking" thickness. This means that in order to reveal the integral image, the operator has to have knowledge of the thickness to be compensated, and a general uncovered reflecting surface will not be useful.

As mentioned above, the "lacking" reflective layer approach can also be applied on devices having the image fragment plane below the micro-lenses.

In many applications, however, it is preferred to have the reflecting layer as an integrated part of the integral image device. In such cases, the integral image device also comprises a reflecting layer 40, positioned on a same side of the array 20 of focusing micro-lenses 22 as the focal plane. The reflecting layer 40 is arranged for reflecting at least a part of light incident on a surface 49 of the reflecting layer 40 facing the array 20 of focusing micro-lenses 22. The array 20 of focusing micro-lenses 22 is thereby positioned between the reflecting layer 40 and the image fragment plane 30. The image fragment plane 30 is arranged to, when being viewed refracted through the array 20 of focusing micro-lenses 22 towards the reflecting layer 40, reflected by the reflecting layer 40 and refracted back through the array 20 of focusing micro-lenses 22 from the reflecting layer 40, give rise to an integral image 100.

Figure 4A:
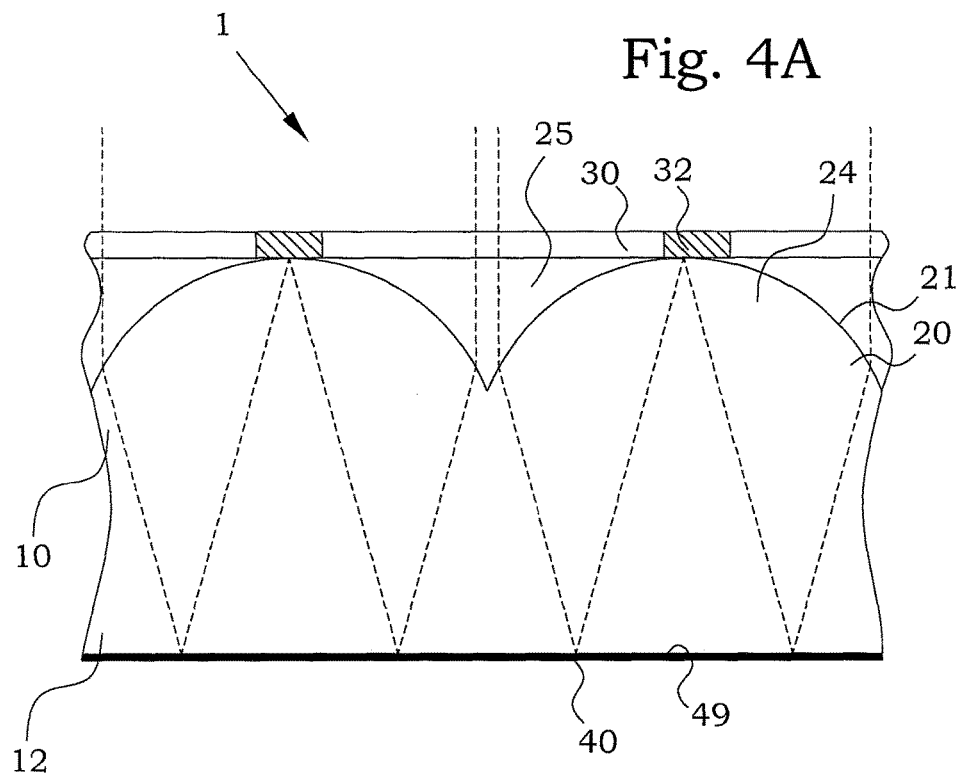
FIG. 4A is a schematic drawing of an embodiment of an integral image device using embedded micro-lenses.

FIG. 4A illustrates another embodiment of an integral image device 1. In this embodiment, the array 20 of focusing micro-lenses is an array 21 of embedded focusing micro-lenses. In the present disclosure, the term "embedded" lens is interpreted as a lens having an interface between a solid material volume and an at least partly optically transmissive volume having a different refraction index than air, together causing the lens optical effect. In other words, micro-lenses are embedded in another material having different optical properties, and the differences in optical properties give rise to a refraction in the interface between the materials. This other material can be a solid, semi-solid or liquid or a gas with a refraction index different from the refraction index of air. In a typical case, this other material is a transparent solid. In the particular embodiment of FIG. 4A, the array 20 of focusing micro-lenses is an array 24 of convex micro-lenses, where the convex micro-lenses are embedded in another material 25, typically another polymer. The material forming the array 24 of convex micro-lenses has a higher refractory index than the embedding material 25. Due to this difference, the total embedded lens system provides a focusing effect. The image fragment plane 30 can then be placed on top of the embedding material 25.

In particular embodiments, at least a part of the material of the image fragment plane 30 may be composed by a same or similar compound as the embedding material 25. In such cases, the boundary between the embedding material 25 and the image fragment plane 30 may be difficult to define. However, since this boundary has no essential optical effect, the integral image device operates in the same way with or without such a material boundary.

Figure 4B:
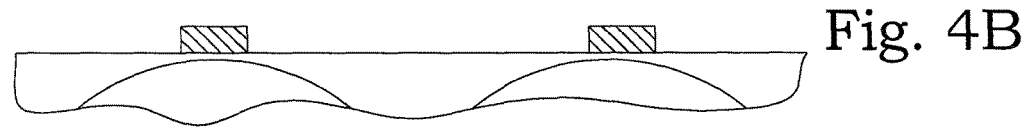
FIGS. 4B-E are schematic drawings of different embodiments of image fragment planes.
Figure 4C:
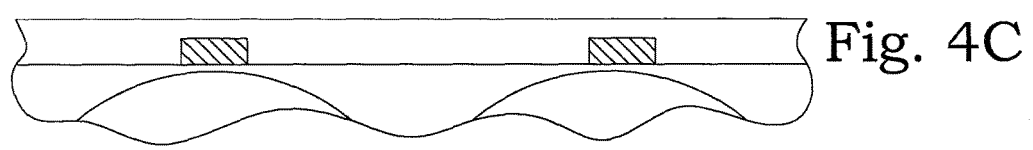
Figure 4D:
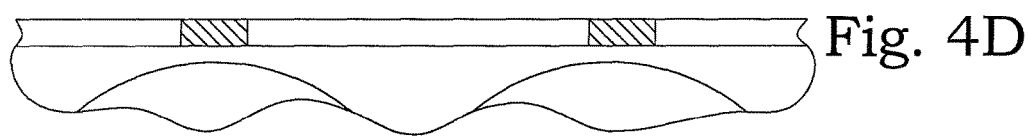
Figure 4E:
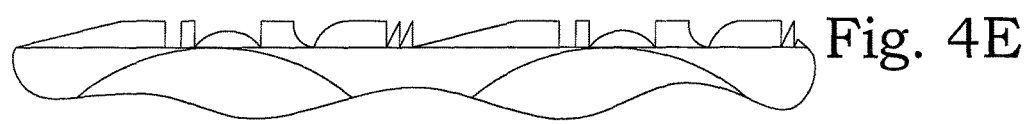

The image fragment plane 30 has so far been illustrated as a continuous image fragment plane with embedded image fragment structures 32. However, there are many alternative embodiments. In FIG. 4B, an image fragment plane only comprising image fragment structures is illustrated. Such an image fragment plane is easily provided e.g. by common printing techniques. The embedding material in the image fragment plane may in another embodiment, as illustrated in FIG. 4C, also cover the image fragment structures. This increase the total device thickness somewhat, but if the image fragment structures are sensitive to environmental conditions or wear, such a compromise may be acceptable anyway. In FIGS. 4B and 4C, there is a small amount of filling material 25 on top of the micro-lenses. This is often advantageous to have for manufacturing reasons. The thickness of such a top coverage can be selected arbitrarily from a zero thickness and upwards, but with the focal length and total thickness measures in consideration. The filling material 25 of the embedded micro-lenses may in yet another embodiment, as illustrated by FIG. 4D, be allowed to also cover the very top of the array 24 of convex micro-lenses by a thicker layer. Such an arrangement will also add some thickness to the device, however, the use of continuous layers instead of interrupted volumes of embedding material, will in many applications improve the adhesion between the array 20 of focusing micro-lenses and the image fragment plane 30. In the remaining part of this disclosure, this possible top coverage material layer will be neglected in the figures and description. However, anyone skilled in the art realizes that the same optical effects also will be present with such a top coverage layer of a non-zero thickness. In FIG. E, yet another embodiment is illustrated, where geometrical shape of an image fragment plane 30 forms the image fragment structures 32. Structures, linear and/or curved, will with different slopes and refraction index differences against the surroundings give rise to an optical contrast. Any type of image fragment structures 32 can easily be integrated into this type of integral image device 1. Structures with different geometrical shapes, such as cavities or protruding elements, linear or curved, can be further enhanced in optical contrast by filling interstices within the cavities or between the protruding elements with colored material. Further possibilities to create the image fragment structures can be by providing a patterned coating or by radiation exposure. Such methods are, as such, well known in prior art. In particular, all the image fragment plane alternatives presented here above can be used in any of the embodiments in the present disclosure.

The image fragment structures 32 discussed here above have been discussed as providing contrast differences by differences in e.g. color, reflective properties or refractive properties. However, by providing extremely small geometrical structures, also diffractive differences can be used. The image fragment structures 32 could e.g. be holographic diffractive structures. The optical contrast created by different image fragment structures is typically created in the visible wavelength region. However, in particular embodiments, image fragment structures creating optical contrast in the UV or IR regions may also be utilized.

Figure 5:
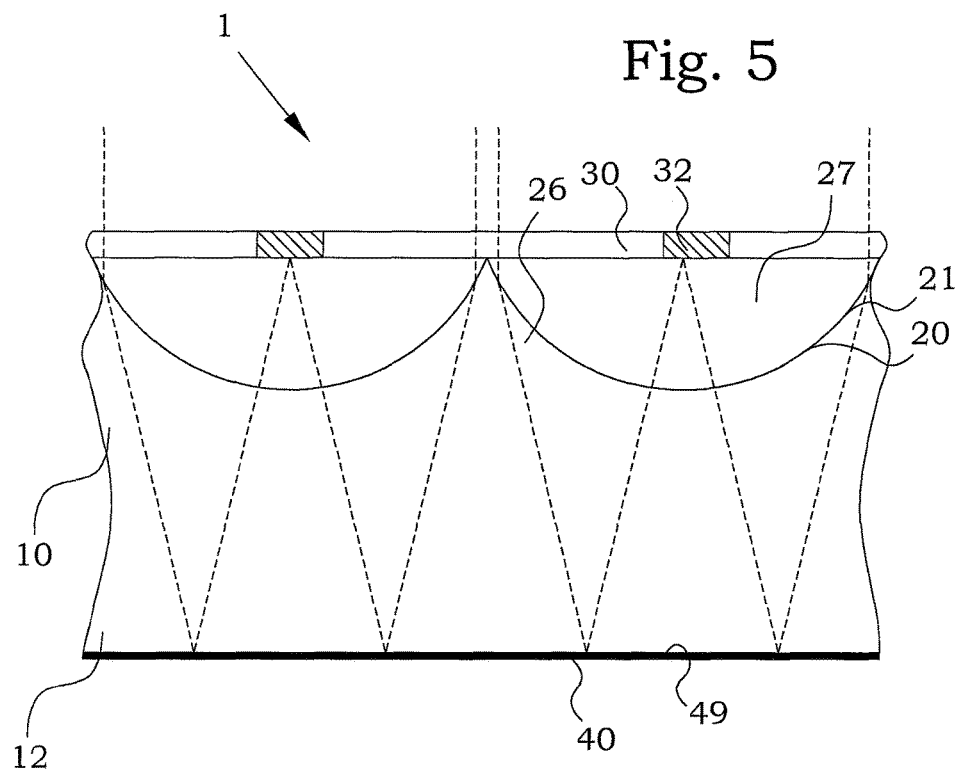
FIG. 5 is a schematic drawing of another embodiment of an integral image device using embedded micro-lenses.

FIG. 5 illustrates another embodiment of an integral image device 1. In this embodiment, the array 20 of focusing micro-lenses is also an array 21 of embedded focusing micro-lenses. However, in this embodiment, the array 20 of focusing micro-lenses comprises an array 26 of concave micro-lenses, where the concave micro-lenses are embedded in another material 27, typically another polymer. The material forming the array 26 of concave micro-lenses has a lower refractory index than the embedding material 27. Due to this difference, the total embedded lens system provides a focusing effect. The image fragment plane 30 can then be placed on top of the embedding material 27.

The provision of the image fragment plane 30 on top of the array 20 of focusing micro-lenses 22, and in particular when using embedded lenses and image fragment plane 30 opens up for additional possibilities of additional advantageous embodiments. In an integral image device e.g. according FIG. 1A-B or FIG. 2, the surface that is exposed to the viewer is typically a surface having small cavities surrounding the array of micro-lenses. Such small cavities are unfortunately perfect for collecting dirt, dust, grease, bacteria etc. When exposed to everyday use, such a device will therefore present a declining image brightness, when dirt is collected in the cavities.

In the integral image device having the image fragment plane 30 provided on top of the array of micro-lenses, the cavities between the micro-lenses are typically not exposed to the surroundings. Since the geometrical cavities in an image fragment plane 30, if any at all, are much smaller, the tendency to collect dirt is reduced significantly. By covering the image fragment plane with a smooth cover layer, the surface can be made extremely smooth and thus minimize the tendency to pick up dirt. The covering material can also selected to be a wear and/or soil resistant layer, which further enhances the advantages with the smooth surface.

In the particular embodiments described above, two basic types of lenses are presented. However, the present ideas can also be utilized together with other types of micro-lenses. As non-excluding examples, different kinds of aspherical lenses can be used as well, embedded or not. Also different kinds of multizonal lenses, e.g. Fresnel lenses, embedded or not, can also be utilized in similar designs as presented above. Also different types of Gradient Index (GRIN) lenses may be possible to use. The lenses are basically utilized in the same manner as presented in different prior art contexts. The lenses can also be of a lenticular type, i.e. being curved in one direction only, or of a two-dimensionally curved type, such as spherical lenses.

Figure 6A:
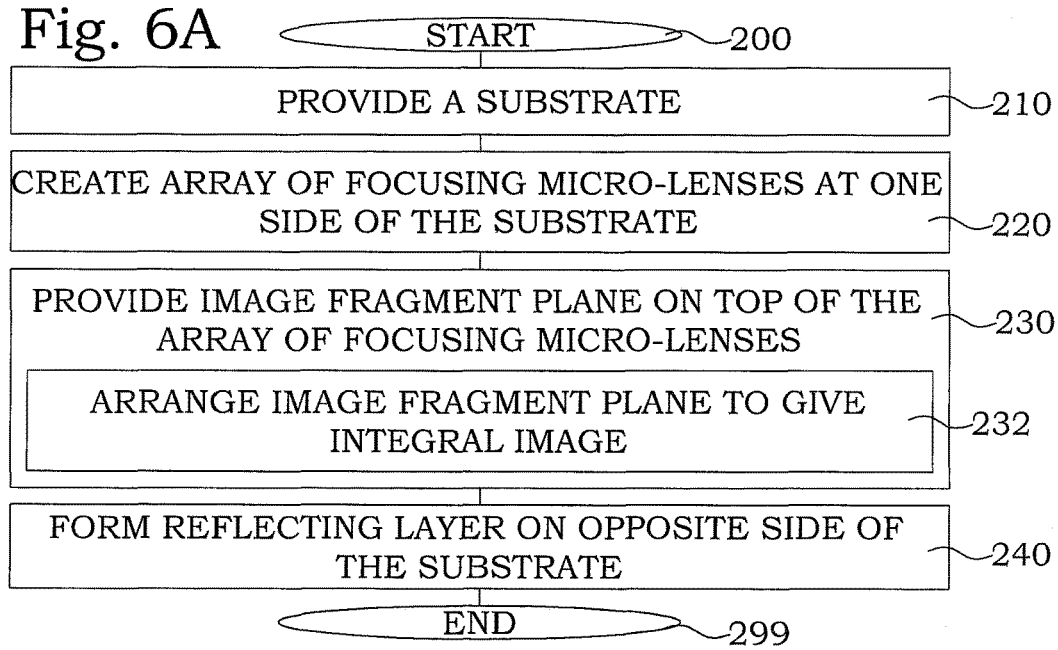
FIG. 6A is a flow diagram of steps of an embodiment of a method for manufacturing of integral image devices.

FIG. 6A illustrates a flow diagram of steps of an embodiment of a method for manufacturing an integral image device. The process starts in step 200. In step 210, a thin, at least partly optically transmissive, substrate is provided. An array of focusing micro-lenses is in step 220 created at a first surface of the substrate. In step 230, an image fragment plane is provided with image fragment structures on top of the array of focusing micro-lenses. A reflecting layer is formed at a second surface of the substrate, opposite to the first surface, in step 240. The reflecting layer is formed for reflecting at least a part of light incident on a surface of the reflecting layer facing the array of focusing micro-lenses. The step 230 of providing the image fragment plane comprises the step 232, in which the image fragment plane with image fragment structures is arranged to, when being viewed refracted through the array of focusing micro-lenses towards the reflecting layer, reflected by the reflecting layer and refracted back through the array of focusing micro-lenses from the reflecting layer, give rise to an integral image. The process ends in step 299.

As mentioned above, an integral image device of the technology presented in the present disclosure can also be provided without reflecting layer. An embodiment of a manufacturing method will in such cases omit the step 240, and the step 232 will instead comprise arranging the image fragment plane to, when being viewed refracted through the array of focusing micro-lenses away from a viewer, reflected back and refracted back through the array of focusing micro-lenses towards the viewer, give rise to an integral image.

The step 240 of forming the reflecting layer is in the embodiment of FIG. 6A illustrated to be performed after the creation 220 of micro-lenses and provision 230 of the image fragment plane. However, in alternative embodiments, the step 240 can occur before, concurrently to, interleaved with and/or after the steps 220 and 230.

Figure 6B:
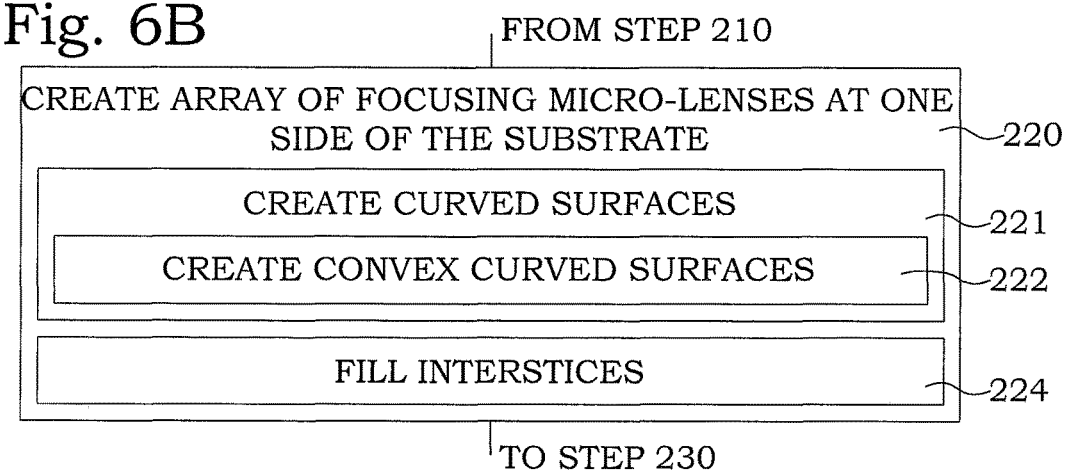
FIGS. 6B-C are part flow diagrams of step 220 of FIG. 6A.

FIG. 6B illustrates a part of a flow diagram of a step of creating an array of focusing micro-lenses of another embodiment of a method for manufacturing an integral image device. The step 220 of creating an array of focusing micro-lenses may in a particular embodiment be comprised in a method according to FIG. 6A. The step 220 of creating an array of focusing micro-lenses in turn comprises a step 221 in which an array of curved surfaces between a first transmissive material and a surrounding gas is created at the first surface of the substrate. The first transmissive material has a first refraction index. The step 220 further comprises the step 224, in which interstices between or within the curved surfaces are filled by a second transmissive material, creating a planar outer surface. The second transmissive material has a second refraction index, different from the first refraction index. In this particular embodiment, the step 221 comprises the step 222, in which a curved convex surface is created at the first surface of the substrate. The second refraction index is lower than the first refraction index, in order to create a focusing micro-lens.

Figure 6C:
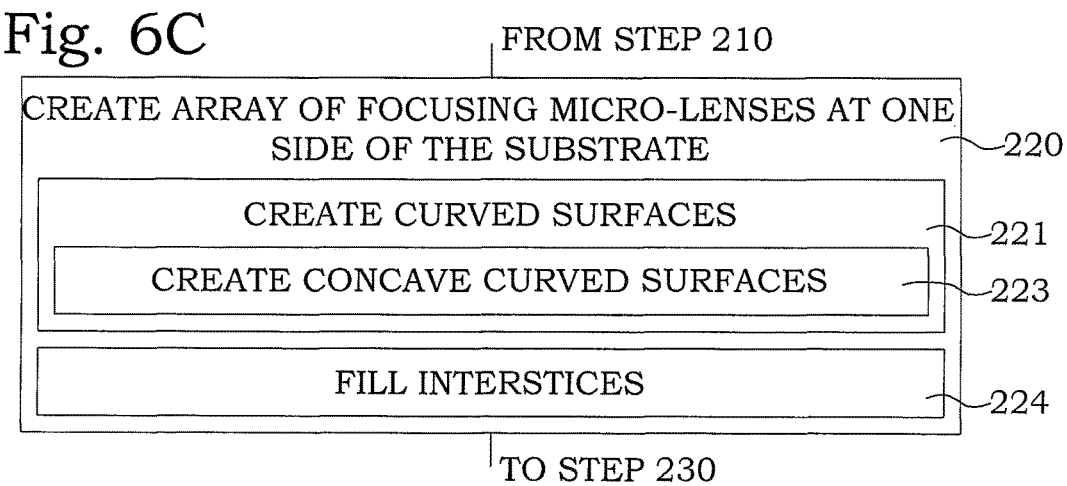

FIG. 6C illustrates a part of a flow diagram of a step of creating an array of focusing micro-lenses of another embodiment of a method for manufacturing an integral image device. The step 220 of creating an array of focusing micro-lenses may in a particular embodiment be comprised in a method according to FIG. 6A. The step 220 of creating an array of focusing micro-lenses in turn comprises a step 221 in which an array of curved surfaces between a first transmissive material and a surrounding gas is created at the first surface of the substrate. The first transmissive material has a first refraction index. The step 220 further comprises the step 224, in which interstices between or within the curved surfaces are filled by a second transmissive material. The second transmissive material has a second refraction index, different from the first refraction index. In this particular embodiment, the step 221 comprises the step 223, in which a curved concave surface is created at the first surface of the substrate. The second refraction index is higher than the first refraction index, in order to create a focusing micro-lens.

When discussing manufacturing methods, it can also be of interest to notice that since the reflecting layer is essential for achieving the reflected integral image, the reflecting layer can be utilized for anti-tampering purposes. If the adhesion or other attachment of the reflecting layer to the remaining integral image device is selected in such a way that the reflecting layer is likely to be removed or destroyed at least partly if the device is removed from a supporting surface, the integral image disappears. It may therefore be difficult for anyone to restore the conditions to again achieve the integral image. In particular, if a weakened interface is provided at a distance above the reflecting layer, it will not be enough by coating the back with a new reflecting layer to restore the image.

The choices of materials in the integral image device are many. In some applications, the use of curable, e.g. by heat or UV radiation, lacquers is an advantageous choice. Today, there are easily manufactured lacquers available that has refraction indices ranging from at least 1.48 to 1.61. Further development points to possible refractive indices as low as 1.45 and as a high as 1.71 within a short period of time. Also other types of materials are possible to use, depending on the actual application. Thermoplastic polymers, such as PC are also often useful. They have typically a refractive index of 1.56-1.57, which in embedded applications can act as high-refractive-index material. Other materials, such as Teflon may also be used where a low refractive index is requested.

Another approach to vary the refractive index is to mix a base material with nanoparticles of another refractive index. The particles in the mix have to be completely dissolved and small enough to avoid scattering effects. Acrylate polymers are easy to handle and by mixing a curable acrylate polymer with high-refractive index particles, such as e.g. $TiO_2$, the refractive index of the resulting material becomes relatively high.

Another possibility is to provide high-refractive-index materials in a solvent. By selecting proper viscosity properties, structures corresponding to micro-lenses and/or image fragments structures may be printed, followed by a heat treatment, whereby the solvent is evaporated.

In order to give rise to an integral image with an optimum use of the material thickness, the image fragment plane is provided on top of the array of focusing micro-lenses. However, the attachment of the array of focusing micro-lenses can be arranged in different manners depending on the actual implementation. In one embodiment, the image fragment plane is permanently attached against the array of focusing micro-lenses. This is the typical situation when the optical effects are requested to be seen without any particular operations. In another embodiment, the image fragment plane is non-permanently positioned against the array of focusing micro-lenses. The image fragment plane could be positioned by use of different means. It can be clamped or glued by non-permanent adhesives to the array of focusing micro-lenses, or simply be held by electrostatic forces of static charging of the components. It could also be positioned by the viewer himself. Such embodiments can be of interest if the item to which the array of focusing micro-lenses is attached is requested to be verified by developing an image by placing the image fragment plane on top of the array of focusing micro-lenses.

The design of the image fragment plane can be performed according to prior art teachings. However, one should be aware of the perceived integral image becomes a mirror version of a corresponding integral image without reflecting layer with the same image fragment plane. In other words, the mirror action of the reflecting layer has to be considers when designing the image fragment structures.

At least most optical effects provided in prior art for non-reflective integral image devices can also be implemented using a reflective layer and an image fragment plane on top of the micro-lens array. As a few non-exclusive examples, image fragment structures arranged with different moiré pitches in different directions give rise to different types of optical effects. By having a pitch that coincides with the pitch of the focusing micro-lens array in one direction, but not a perpendicular direction, no integral image will be seen from a plane device. However, if the device is bent in a certain curvature around an axis perpendicular to the direction of the coinciding pitches, an integral image will appear. This is e.g. useful for labels intended to be provided on curved surfaces. If the pitches are different in different directions, but not equal to the pitch of the focusing micro-lens array, the apparent integral image depth or height may change upon rotating the integral image device within the plane of the device. If a misaligning is provided between the image fragment structures and the array of focusing micro-lenses, orthoparallactic effects can be achieved. If the pitch of the image fragment structures and the array of focusing micro-lenses is equal in all directions, no integral image will be seen under normal viewing conditions and normal viewing distances. However, if the device is viewed from a very small distance, or further imaged from a small distance, an integral image will appear. Such keyhole effects are, as such, known in prior art, but may advantageously also be provided by the present types of devices.

The use of a reflecting layer 40 changing the direction of the light rays forming the imaging opens up for further interesting combination possibilities. One way to exploit such combination possibilities is to arrange the reflecting layer for transmitting at least a part of light incident on the surface of the reflecting layer facing the array of focusing micro-lenses. In other words, a semireflecting and semi-transmitting reflective layer is used. A part of the light will thus be reflected and can be utilized according to the approaches described further above. Light will also pass the semitransmitting reflective from the back side, and can be utilized e.g. for adapting a light contrast between the integral image and a background.

The part of the light that passes through the reflective layer, can further be utilized to achieve additional integral images and the result will resemble a conventional integral image device.

Figure 7:
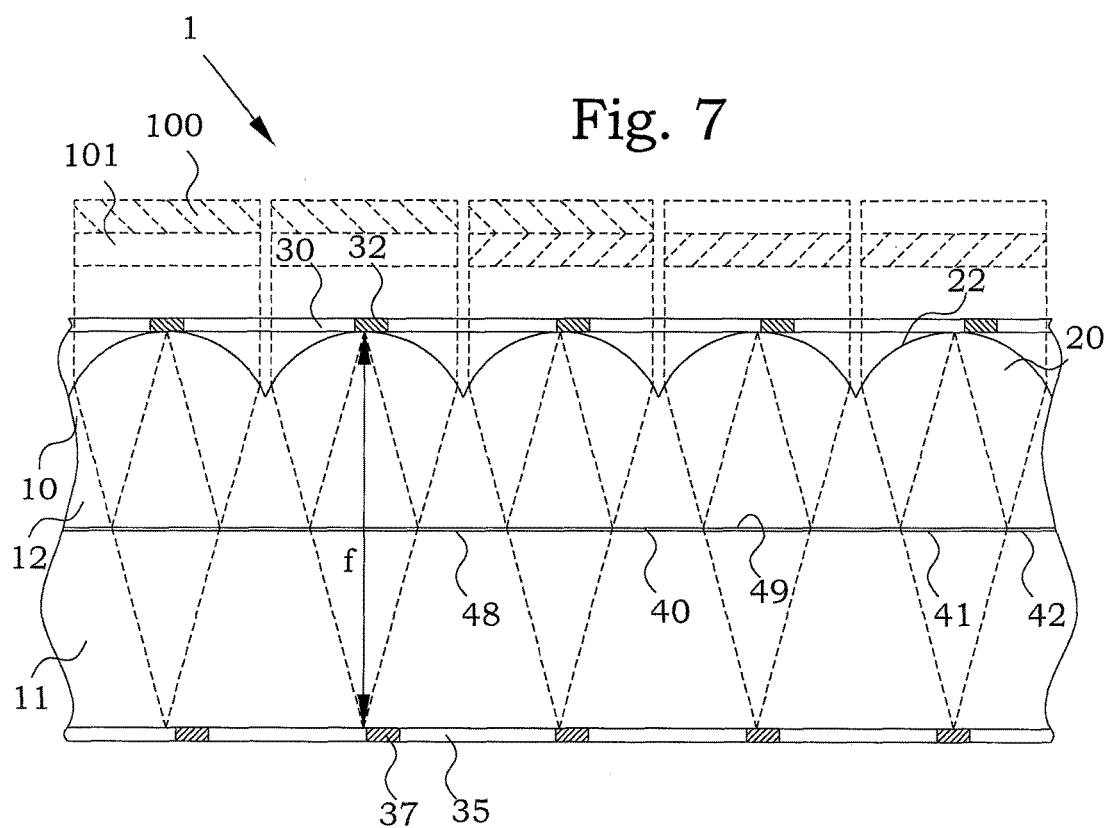
FIG. 7 is a schematic drawing of an embodiment of an integral image device with a semitransparent reflecting layer and two image fragment planes.

FIG. 7 illustrates an embodiment of an integral image device 1. The upper part of the integral image device 1 resembles the embodiments discussed further above. However, the reflective layer 40 is in this embodiment a semi-transmitting reflective layer 41, transmitting at least a part of light incident on the surface 48 of the reflecting layer 40 facing away from the array 20 of focusing micro-lenses. In this particular embodiment, the reflective layer 40 is a semitransparent reflective mirror 42. One way to accomplish such a semitransparent reflective mirror 42 is to provide a reflective cover on the bottom surface of the substrate 10 that is so thin that some light will be let through. In other words, the reflecting layer 40 has thickness allowing at least a part of light to be transmitted to be transmitted through the reflecting layer 40. The embodiment of FIG. 7 further comprises an additional image fragment plane 35. The additional image fragment plane 35 has, in analogy with the image fragment plane 30 additional image fragment structures 37. The reflecting layer 40 is positioned between the image fragment plane 30 and the additional image fragment plane 35. The additional image fragment plane 35 is positioned at a distance from the array 20 of focusing micro-lenses that is in the vicinity of the focal length f. The distance between the reflecting layer 40 and the additional image fragment plane 35 is in this embodiment fixed by inserting a thin, at least partly transmissive, additional substrate 11, typically a substrate polymer foil 13.

The image fragment plane 30 is in analogy with the description further above enlarged and provided as an integral image by the array 20 of focusing micro-lenses, however, with a lower intensity, since not all light from the image fragment plane 30 is reflected at the reflective layer 40. Furthermore, light emitted from parts of the additional image fragment plane 35 can to a part pass through the reflective layer 40 and reach the array 20 of focusing micro-lenses. The additional image fragment plane 35 is thus arranged to, when being viewed through the reflecting layer 40 and through the array 20 of focusing micro-lenses, give rise to an additional integral image. The array 20 of focusing micro-lenses will thus also provide an enlarged integral image 101 of the part of the additional image fragment plane 35, overlaid on the integral image 100 of the part of the image fragment plane 30. Two overlaid integral images can thus be seen by a viewer.

The relative intensity between the images is determined by the transmittance and reflectivity of the reflective layer 40 and by the light situation around the integral image device. If the additional image fragment plane 35 is provided without background or with a partly transparent background, the intensity of the corresponding integral image will typically increase if the device is illuminated from behind. Similarly, the relative intensity of the integral image corresponding to the image fragment plane 30 will increase if the device is illuminated at the front surface.

Figure 8A:
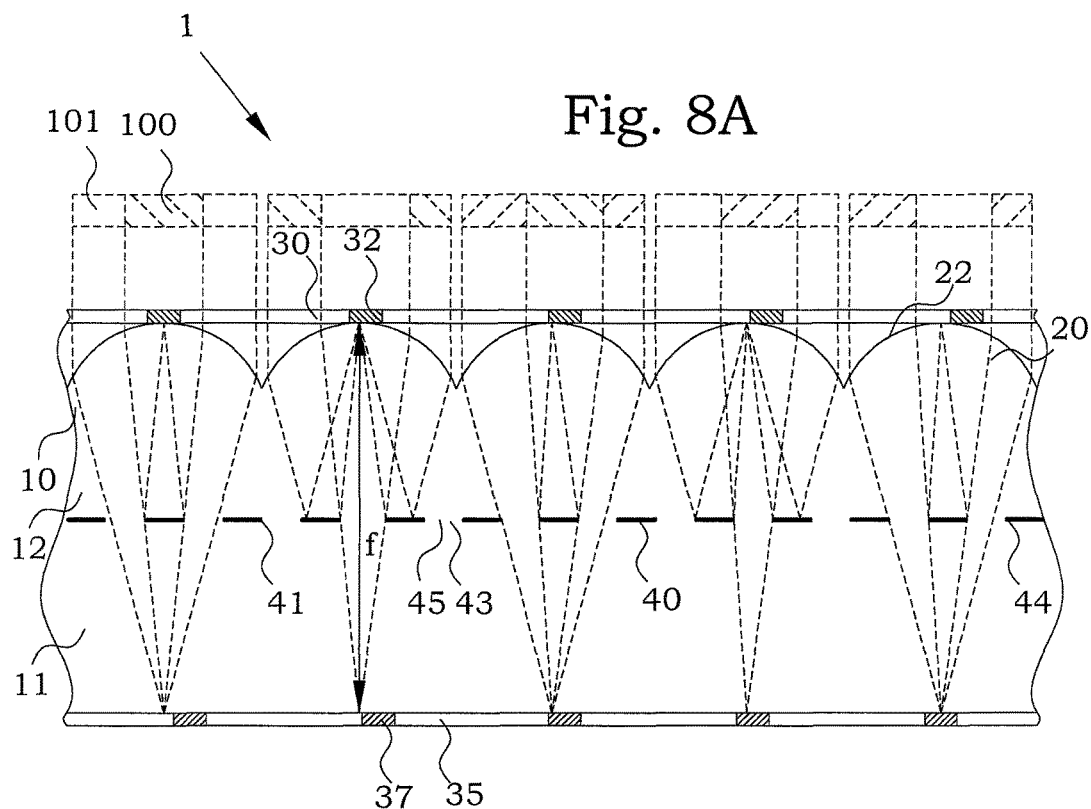
FIGS. 8A-B are schematic drawings of another embodiment of an integral image device with a semitransparent reflecting layer and two image fragment planes.

A semitransmitting reflective layer 41 can be provided also by other means. FIG. 8A illustrates another embodiment of an integral image device 1 with one ordinary image fragment plane 30 and an additional image fragment plane 35. Here the reflective layer 40 is also a semitransmitting reflective layer 41, which in this embodiment is provided by alternating transmitting sections 43 and reflecting sections 44. In other words, the reflecting layer 40 is perforated with perforations 45 allowing the light to be transmitted to be transmitted through the perforations 45. The light to be reflected is reflected on areas between said perforations 45. The reflecting section 44 will cause the structures of the image fragment plane 30 to be enlarged and shown over a part of the micro-lens surface. The transmitting sections 43 will instead cause the structures of the additional image fragment plane 35 to be enlarged and shown over a part of the micro-lens surface. Parts of two different integral images will thus be provided. The brain of a viewer will then combine the two different integral image parts into two different images. If the distribution of the perforations 45 is random or periodical with a pitch considerably different from the pitch of the focusing micro-lenses, the relative intensities of the two integral images will be relatively uniform of the device. The relative intensities of the two integral images will also be proportional to the relative total areas of the perforation compared to the total areas of the reflecting sections. Also here, if the additional image fragment plane 35 is provided without background or with a partly transparent background, the intensity of the corresponding integral image will typically increase if the device is illuminated from behind. Similarly, the relative intensity of the integral image corresponding to the image fragment plane 30 will increase if the device is illuminated at the front surface.

Figure 8B:
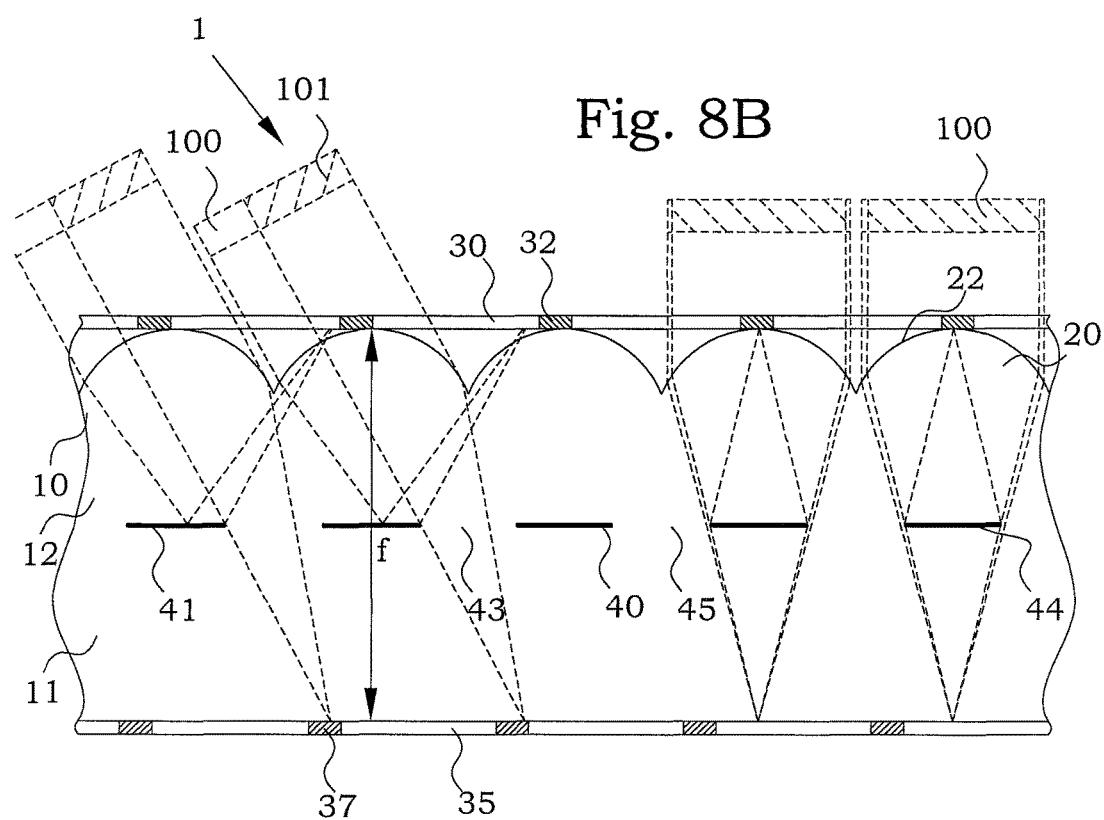

In FIG. 8B, another embodiment of an integral image device 1 with one ordinary image fragment plane 30 and an additional image fragment plane 35 is illustrated. Here, the perforations 45 are provided in a regularly repeated pattern. In this particular embodiment, the regularly repeated pattern also has the same pitch as the pitch of the focusing micro-lenses. This has the effect of selecting the relative intensity for the two different integral images depending on the angle of view. In the right part of the figure, a situation where the integral image device is viewed directly from the front is illustrated. Since the reflecting sections 44 occupy most of the view, almost only the upper image fragment plane is seen. In the left part of the figure, a situation where the integral image device is viewed from another angle is illustrated. Here, the reflecting sections 44 do only cover a part of the field of view and the main part of the view will therefore originate from the bottom image fragment plane. The relative intensity between the two different integral images will vary according to the viewing angle, but still essentially homogeneous over the entire device.

If the pitch of the perforations differ only a minor amount from the pitch of the focusing micro-lenses, the two different integral images will be shown on the device with relative intensities that vary over the surface. Furthermore, if the viewing angle is changed, the intensities in the different positions will change, but in a way that differs over the surface. An optical effect of an intensity wave over the device is the result. By further selecting the shape of the reflecting sections, one can create intensity differences of the same shape in accordance with the moiré magnification theory. However, since the reflecting layer is not positioned in the focal plane, the transition between the respective intensity differences will be fairly slow and with low resolution. However, simple geometrical profiles could be perceivable, for example circles, squares and other simple objects. The intensity aperture in itself will appear to be positioned in a plane below or above the foil surface depending on if the pitch of the reflective section is smaller or larger than the micro-lens pitch.

Figure 9:
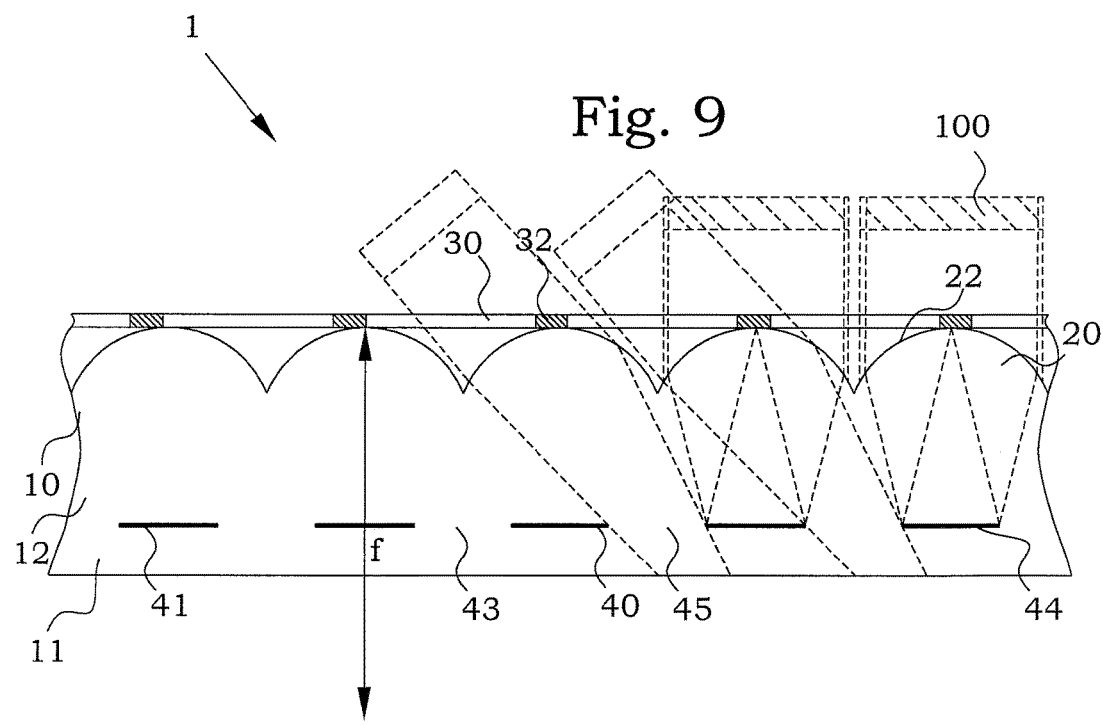
FIG. 9 is a schematic drawing of an embodiment of an integral image device with a semitransparent reflecting layer and one image fragment plane.

The use of reflecting layers having perforations provided in a regularly repeated pattern can also be utilized in embodiments without any additional image fragment plane 35. This is illustrated in FIG. 9. In such embodiment, the regularly repeated pattern of the perforations, or rather the reflecting areas between the perforations, determine in what angle ranges the reflected integral image will be visible. If the regularly repeated pattern is in registry with the focusing micro-lens array, the same angle limitations will be applied to the entire surface part of the device. The same effect as described above will be the result, however, with a transfer between an integral image and no image at all. A limitation of the field of view is achieved, i.e. a "viewing aperture", however, due to the fact that the reflecting layer is not situated anywhere close to the focal length of the micro-lenses, the border of the aperture is rather diffuse.

If the regularly repeated pattern has a pitch that differs only by a small factor from the pitch of the array of focusing micro-lenses, different parts of the surface will have different angle limitations. The field of view is thus limited in different ways at different surface sections. If the reflecting areas have a same shape, a diffuse enlargement of that shape will act as a border of the viewing aperture.

Figure 10:
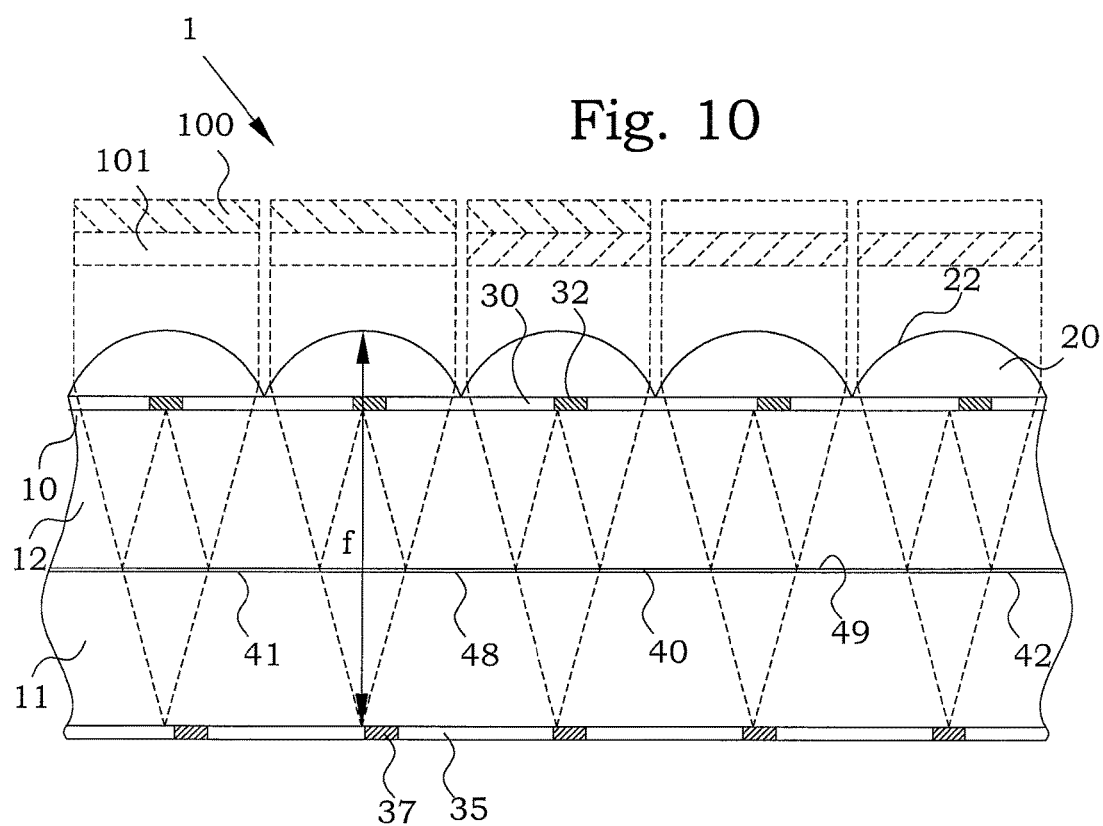
FIG. 10 is a schematic drawing of an example of an integral image device with a semitransparent reflecting layer and two image fragment planes.

The principles of having two integral images from two image fragment planes are also applicable to other designs of integral image devices having a semitransmitting reflective layer. In FIG. 10, an example of an integral image device 1 having the image fragment plane 30 placed immediately below the array 20 of focusing micro-lenses is illustrated. The principles are the same as in FIG. 7, however, the relative thicknesses of the layers 11 and 12 have to be adapted accordingly. In further alternative examples, the image fragment plane 30 could be placed at any position between the semitransmitting reflective layer and the array of focusing micro-lenses, with subsequent adaptations of the thicknesses of the different spacing layers.

Also the principles of FIGS. 8A-B and FIG. 9 are applicable to integral image device having the image fragment plane placed immediately below the array of focusing micro-lenses, or anywhere between the array of focusing micro-lenses and the semitransmitting reflective layer.

Figure 11A:
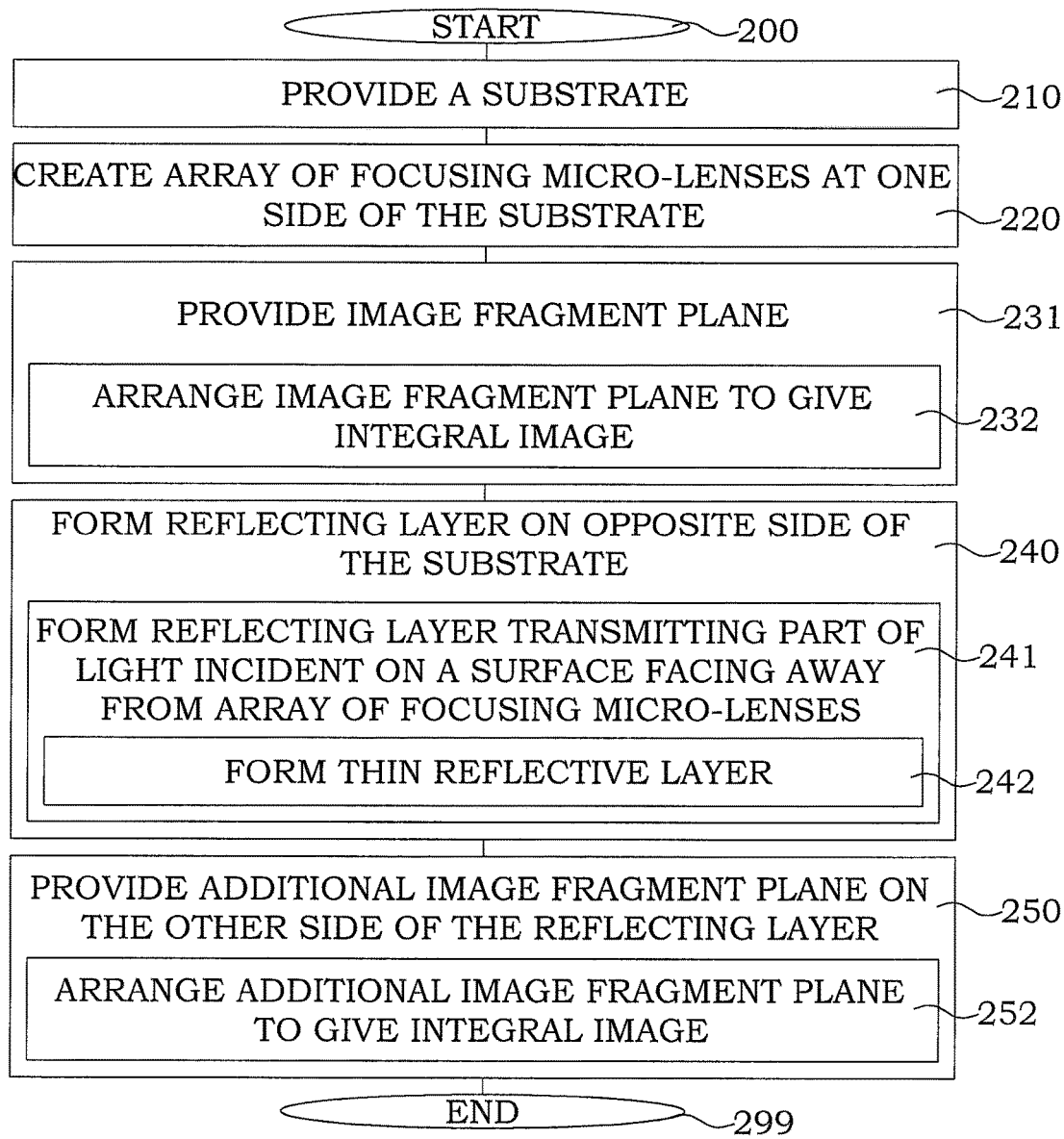
FIG. 11A is a flow diagram of steps of an embodiment of a method for manufacturing of integral image devices with a semitransparent reflecting layer and two image fragment planes.

FIG. 11A illustrates an embodiment of a method for manufacturing of an integral image device. The process starts in step 200. In step 210 A substrate is provided. In step 220, an array of focusing micro-lenses are created at one side of the substrate. In step 231, an image fragment plane is provided. The step 231 comprises the step 232 of arranging the image fragment plane to give an integral image in the final device. In the present embodiment, the step 231 is illustrated following on step 220, and the step 231 is in this embodiment intended to comprise the formation of an image fragment plane on top of the micro-lenses. However, in an alternative embodiment, the step 231 may occur before step 220. In a particular such embodiment, the step 231 is intended to comprise the formation of an image fragment plane below of the micro-lenses.

In the embodiment of FIG. 11A, in step 240, a reflecting layer is formed on an opposite side of the substrate, with respect to the array of focusing micro-lenses. Step 240 comprises in turn the step 241 of forming a reflecting layer 30 transmitting a part of the light incident on a surface facing away from the array of focusing micro-lenses. In other words, the reflecting layer is partly transparent for light coming from behind. In this particular embodiment, the step 241 comprises the step 242, where the partly optically transmitting reflecting layer is provided by forming a reflective layer that is thin enough to allow a partial transmission. In other words, the step of forming a reflecting layer at a second surface of the substrate comprises forming of a reflecting layer with a thickness allowing he at least a part of the light to be transmitted is transmitted through the reflecting layer. In step 250, an additional image fragment plane is provided on the other side of the reflecting layer. This is performed so that the reflecting layer becomes positioned between the image fragment plane and the additional image fragment plane. Step 250 comprises the step 252 of arranging the additional image fragment plane to give an additional integral image in the final integral image device. In other words, the step of providing the additional image fragment plane comprises arranging the additional image fragment plane with image fragment structures to, when being viewed through the reflecting layer and through the array of focusing micro-lenses, gives rise to an additional integral image. Typically, this also involves the provision of a distancing layer or substrate to position the additional image fragment plane in the vicinity of a focal plane of the focusing micro-lenses as such, i.e. without the action of the reflective action of the reflective layer. The process ends in step 299.

In embodiments, where an additional integral image is not requested, step 250 may be omitted.

Figure 11B:
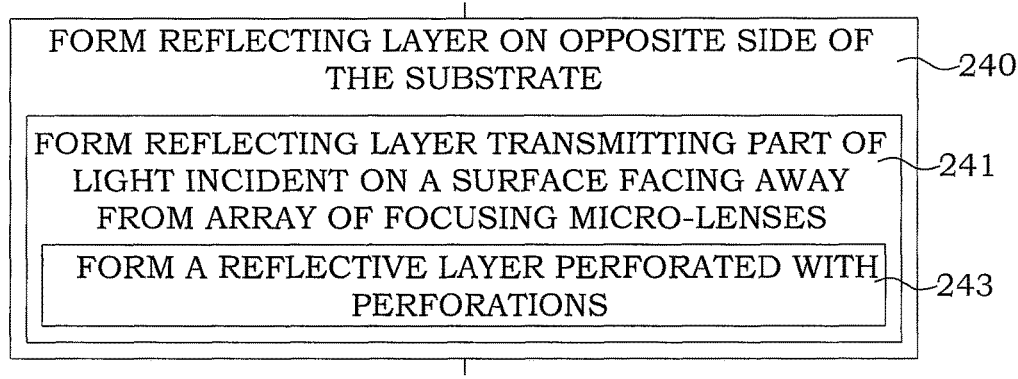
FIG. 11B is a part flow diagram of step 240 of FIG. 11A.

FIG. 11B illustrates a part flow diagram of another embodiment of a method for manufacturing of an integral image device. In this embodiment, step 241 comprises the step 243, in which a reflecting layer is formed, perforated with perforations allowing the at least a part of the light to be transmitted is transmitted through the perforations, and wherein the at least a part of the light to be reflected is reflected on areas between the perforations.

In one embodiment, the step of forming a reflecting layer perforated with perforations comprises providing of the perforations in a regularly repeated pattern. In one particular embodiment, the perforations are provided with a pitch corresponding exactly to a pitch of the focusing micro-lenses. In another particular embodiment, the perforations are provided with a pitch being different to but close to a pitch of the focusing micro-lenses.

Figure 12:
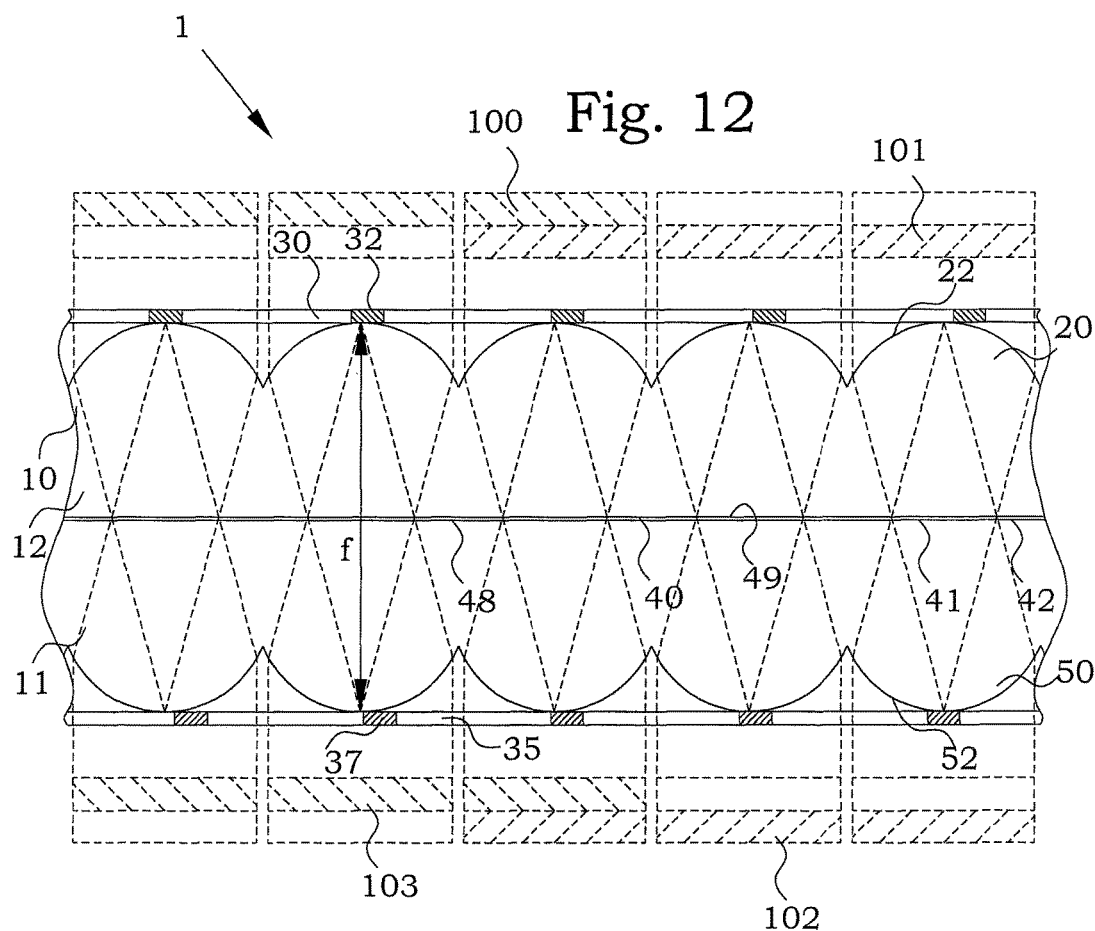
FIG. 12 is a schematic drawing of an embodiment of an integral image device viewable from both sides.

The ideas of utilizing a semitransparent, semireflecting layer and two different image fragment planes can be further developed. In FIG. 12, an embodiment of an integral image device 1 is illustrated, which can be viewed from both sides. To this end, the integral image device 1 comprises an additional array 50 of focusing micro-lenses 52. The additional array 50 of focusing micro-lenses 52 is positioned between the reflecting layer 40 and the additional image fragment plane 35. Typically, an additional substrate polymer foil 11 is provided to assist in positioning the additional array 50 of focusing micro-lenses 52 at a proper distance. The reflecting layer 40 is additionally arranged for reflecting at least a part of light incident on a surface 48 of the reflecting layer 40 facing the additional array 50 of focusing micro-lenses 52. The additional image fragment plane 35 is arranged to, when being viewed reflected via the reflecting layer 40 and through the additional array 50 of focusing micro-lenses 52, give rise to an opposite-side integral image 102. Likewise, the image fragment plane 30 is arranged to, when being viewed through the reflecting layer 40 and through the additional array 50 of focusing micro-lenses 52, give rise to an additional opposite-side integral image 103.

The integral images are thus is such an embodiment visible from both sides of the integral image device 1. Since the reflecting layer 40 is situated half-way between the array 20 of focusing micro-lenses and the additional array 50 of focusing micro-lenses 52, both the image fragment plane 30 and the additional image fragment plane 35 can be utilized for viewing from both sides.

The particular type of semitransparent reflecting layer may be varied in the same manner as in the embodiments of FIGS. 7, 8A-B and 9 described further above.

Figure 13:
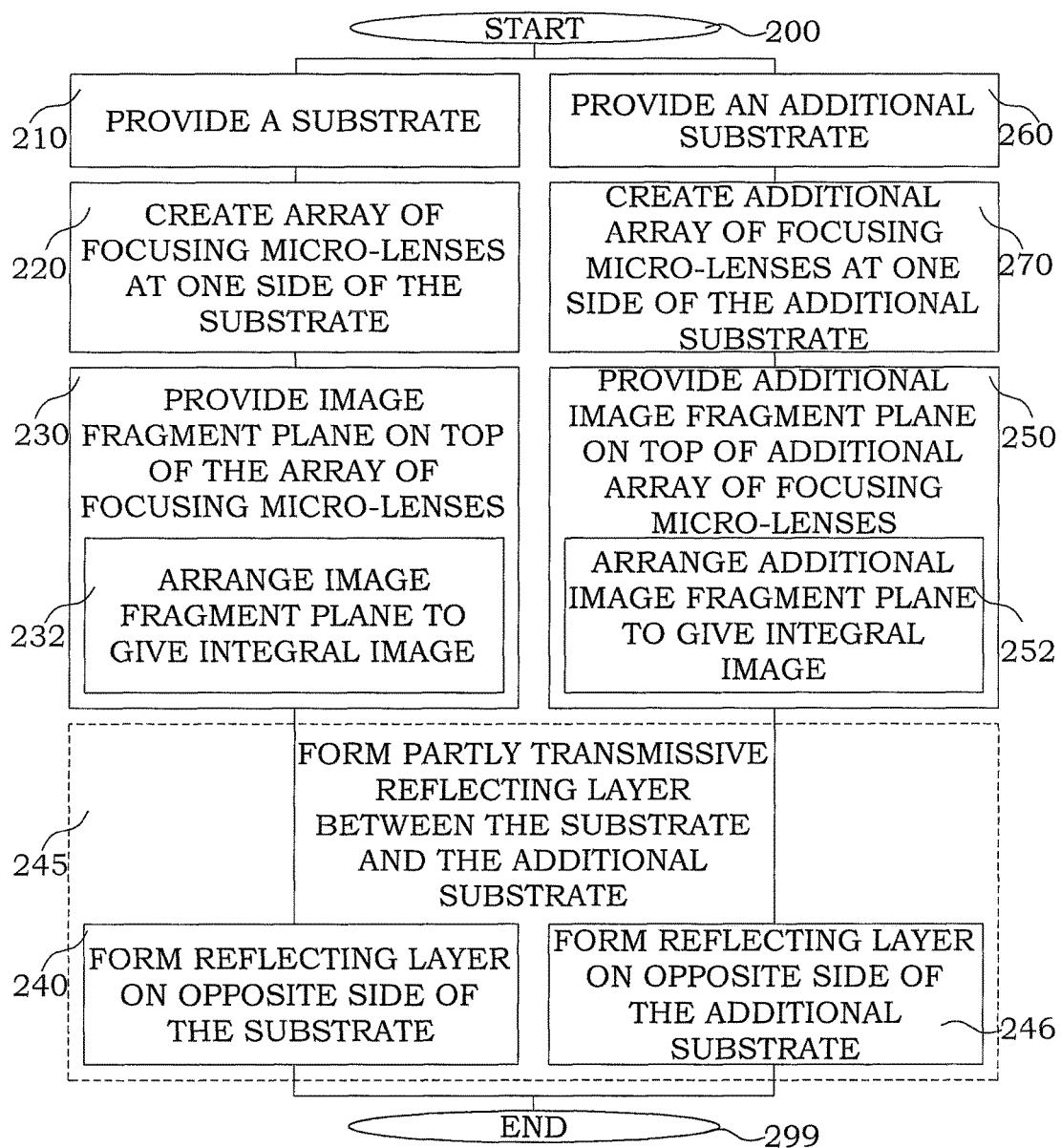
FIG. 13 is a flow diagram of steps of an embodiment of a method for manufacturing of integral image devices viewable from both sides.

FIG. 13 illustrates a flow diagram of steps of a method for manufacturing an integral image device. Steps 210, 220, 230 and 232 are essentially the same as in FIG. 6A further above. In step 260, a thin, at least partly optically transmissive, additional substrate is provided. In step 270, an additional array of focusing micro-lenses is created at a first surface of the additional substrate. In step 251, an additional image fragment plane is provided on the other side of the reflecting layer, on top of the additional array of focusing micro-lenses. Step 251 in turn comprises the step 252, wherein the additional image fragment plane with image fragment structures is arranging to, when being viewed via the reflecting layer and through the additional array of focusing micro-lenses, give rise to an additional integral image. Step 230 in turn comprises the step 232, which comprises arranging of the image fragment plane with image fragment structures to, when being viewed through the reflecting layer and through the additional array of focusing micro-lenses, give rise to an additional integral image.

In step 245, a partly transmissive reflecting layer is formed between the substrate and the additional substrate. This step in turn comprises the step 240 of forming a reflecting layer at a second surface of the substrate and the additional step of forming the reflecting layer at a second surface of the additional substrate, where the second surface of the additional substrate is opposite to the first surface of the additional substrate. The procedure ends in step 299.

The figure above is illustrated as if the steps would be performed in a particular order. However, there are many different approaches, in which some of the steps are provided in other orders and the order illustrated in FIG. 13 should not be considered as limiting for the general manufacturing processes described herein. A number of different alternatives of detailed embodiments is indeed available. In one particular embodiment, the substrate and the additional substrates are first provided as separate items. After provision of the focusing micro-lenses and the image fragment planes, the two parts are laminated or attached to each other in any other way with the reflecting layer between. In one particular embodiment, the reflecting layer is provided on one of the substrates and the coated substrate is attached to a non-coated substrate. In another particular embodiment, two uncoated substrates are laminated together with a reflective layer between them.

In another particular embodiment, the first substrate with its micro-lenses and image fragment plane is first provided. The back-side of the substrate is then coated with a reflecting layer. A second additional substrate is then formed onto the reflecting layer by any conventional coating methods. The micro-lenses and image fragment plane of the additional part of the device is then formed onto the deposited additional substrate.

In a further particular embodiment, the substrates, both the first one and the additional can be provided with micro-lenses in a common process. The resulting lens-equipped substrates are divided into different batches as starting material for the different sides of the final device. The two substrates can then be provided with a reflecting layer and laminated together, and the provision of the two image fragment planes can then be performed on the laminated product, simultaneous or one at a time.

In the view of struggling for thinner integral image devices, different kinds of focusing elements can be combined. In particular in cases where a reflecting layer is used, also this reflective layer can contribute to a more compact focusing action. FIG. 14A illustrates an integral image device 1 with a curved reflective layer 40. The reflective layer has in this embodiment reflective portions 60 that are concavely curved, as seen from the focusing micro-lens side, which gives rise to an additional focusing action. The reflective portions 60 are arranged in an array that is laterally aligned with the array of focusing micro-lenses 20, in order to cooperate in the focusing action. By this arrangement, the total thickness t of the integral image device 1 can be further reduced. However, the alignment of the two focusing arrays needs to be very accurate in order not to blur the resulting image.

In FIG. 14A, the image fragment plane 30 is provided on top of the array 20 of focusing micro-lenses 22, which gives an extremely thin device. However, the approach of using a combination of concavely curved reflective portions 60 aligned with the array 20 of focusing micro-lenses 22, can also be applied to other designs. One such design is illustrated in FIG. 14B, where the image fragment plane 30 is provided below the array 20 of focusing micro-lenses 22.

Figure 14C:
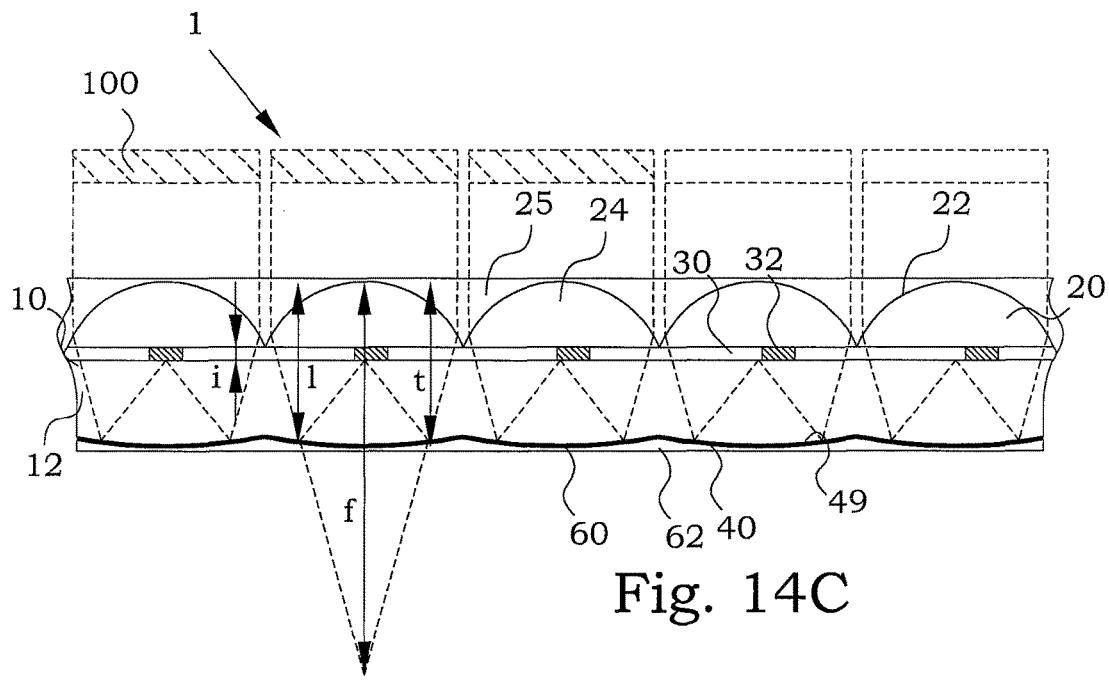
FIG. 14C is a schematic drawing of another example of an integral image device with a curved reflective layer.

FIG. 14C illustrates an integral image device 1 with a curved reflective layer 40 and embedded lenses. The embedding of the lenses contributes, as mentioned above, to provide a surface that is smooth and less attractive for contamination. If also the back side of the integral image device is exposed to the surroundings, also this side could be embedded, as illustrated by the material 62. Due to the possibilities to use extremely narrow integral image device 1, the overall stability of the device may be very low. The devices are often experiences as being flabby. The forming of the micro-lenses and the curved reflection layer further enhance this structural weakness. By then embedding the curved structures, possibly on both sides, have the further effect of stabilizing the entire integral image device.

The use of embedded lenses and/or embedded curved reflection layer can of course also be applied on integral image device having the image fragment plane provided on top of the array of focusing micro-lenses.

Figure 15:
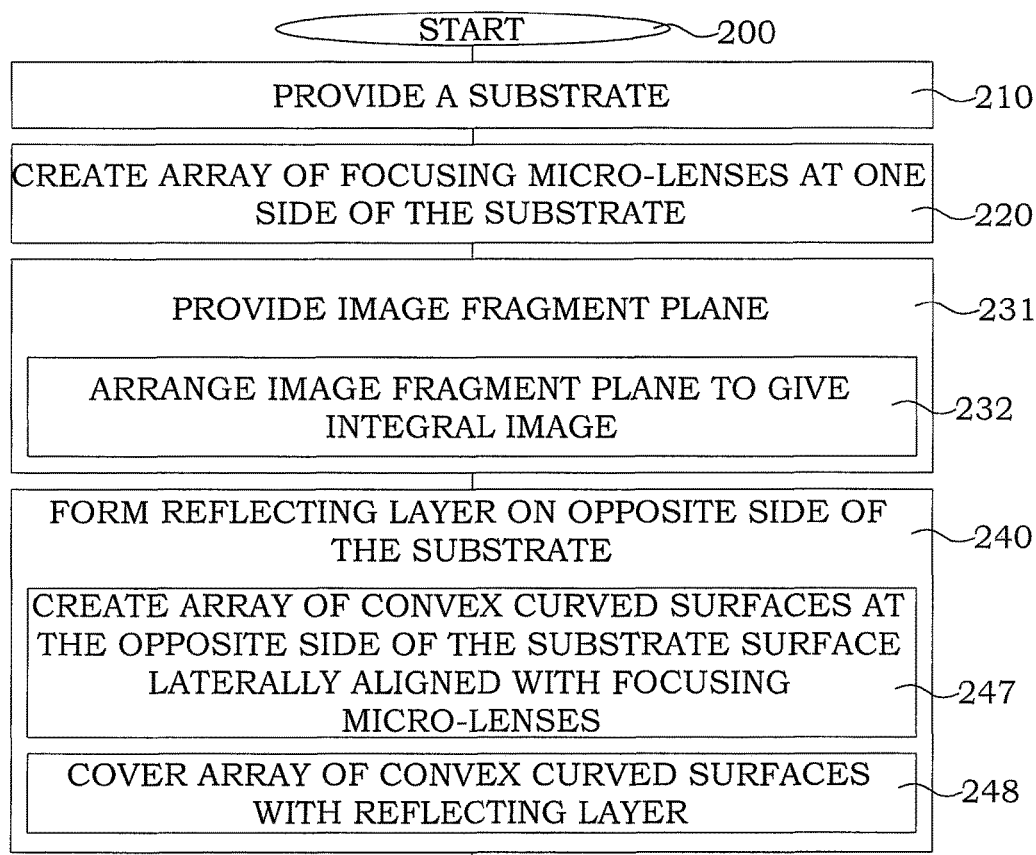
FIG. 15 is a flow diagram of steps of an embodiment of a method for manufacturing of integral image devices with a curved reflective layer.

FIG. 15 illustrates one embodiment of a method for manufacturing an integral image device. The steps 200, 210 and 220 follows the same principles as being discussed further above. Step 231 is described in connection with FIG. 11A, and may result in image fragment plane on top of the array of focusing micro-lenses or elsewhere within the device above the reflecting layer, e.g. an image fragment plane just below the array of focusing micro-lenses.

In this embodiment, step 240 of forming a reflecting layer comprises the step 247, in which an array of convex curved surfaces is created at the second surface of the substrate. One of the step 247 of creating the array of convex curved surfaces at the second surface and the step 220 of creating the array of focusing micro-lenses at the first surface comprises the step of laterally aligning the array of convex curved surfaces at the second surface with the array of focusing micro-lenses at the first surface. The step 240 further comprises the step 248, in which the array of convex curved surfaces at the second surface is covered with the reflecting layer. The procedure ends in step 299.

Figure 16:
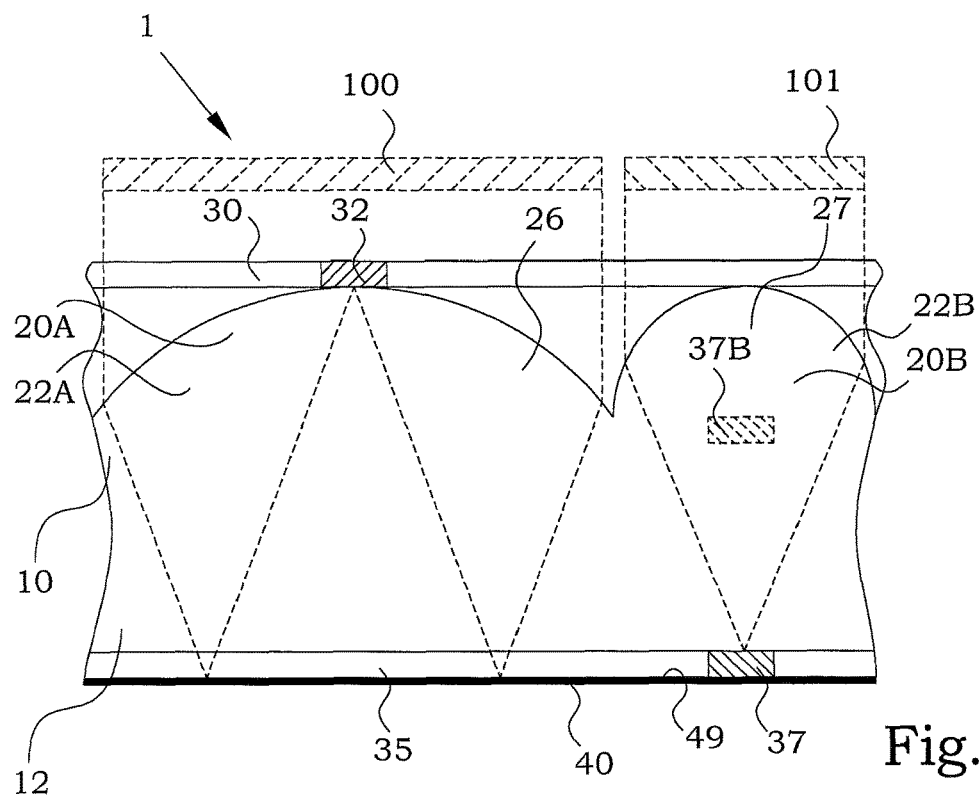
FIG. 16 is a schematic drawing of an embodiment of an integral image device with micro-lenses of different focal lengths.

The lenses of the integral image device can also be designed in different ways. There might e.g. be lenses having different focal lengths. In one embodiment, illustrated in FIG. 16, a first array 20A of focusing micro-lenses 22A with one focal length is interleaved with a second array 20B of focusing micro-lenses 22B with another focal length. The first array 20A has focusing micro-lenses 22A which has a focal length which is approximately twice the device thickness. These focusing micro-lenses 22A thus create an integral image 100 of the image fragment structures 32 of the image fragment plane 30 on top of the focusing micro-lenses 22A, as illustrated in the left part of the figure. The second array 20B has focusing micro-lenses 22B which has a focal length which is approximately equal to the device thickness. These focusing micro-lenses 22B thus create an integral image 101 of the image fragment structures 37 of the additional image fragment plane 35 provided in connection with the reflecting layer 40, as illustrated in the right part of the figure.

In further alternative embodiments, the additional image fragment structures could be positioned elsewhere within the integral image device 1, e.g. at the position illustrated as 37B. The corresponding focusing micro-lenses then have to have a focal length essentially corresponding to the distance between the additional image fragment structure 37B and the lens array 20B, either in a direct view or reflected in the reflecting layer 40. Since the additional image fragment structure 37B in the figure is situated just below the lenses, the reflected view is most probable in this particular case.

Figure 17:
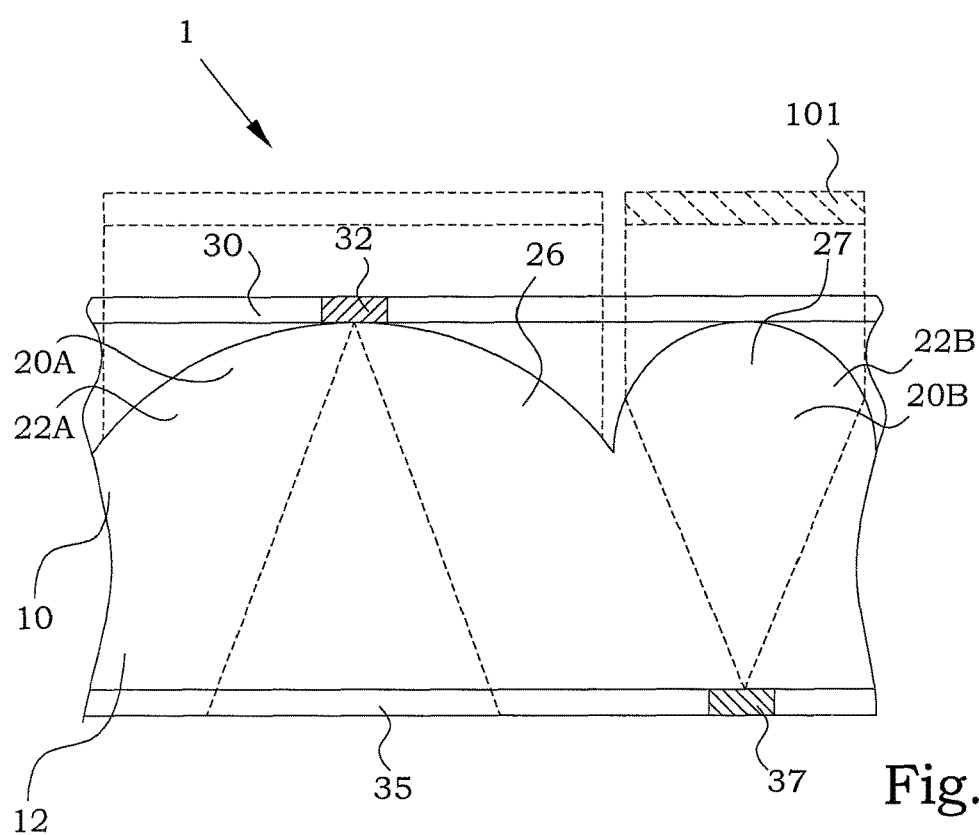
FIG. 17 is a schematic drawing of an embodiment of an integral image device with micro-lenses of different focal lengths but without reflecting layer.

A viewer will see two superimposed integral images, one from each array of micro-lenses. When one of these images is created by a direct view, these two images can be further utilized for e.g. anti-tampering devices. If the device is firmly attached by the reflecting layer to a surface of which the anti-tampering is concerned, and the adhesion between the reflecting layer 40 and the rest of the integral image device 1 is relatively weak, an attempt to remove the integral image device will probably cause the integral image device 1 to break between the reflecting layer 40 and the rest of the integral image device 1. Without reflecting layer, one of the integral images will disappear, which then becomes a sign of an attempted tampering action. This is schematically illustrated in FIG. 17.

The same basic set-up can also be utilized for authentication purposes in the opposite direction. If a device according to FIG. 17 is produced, only one integral image will be possible to see. However, if the device is pressed or attached to a dark surface or preferably a highly reflecting surface, a second integral image will appear, superimposed on the original one. This can be utilized for authentication purposes.

Figure 18:
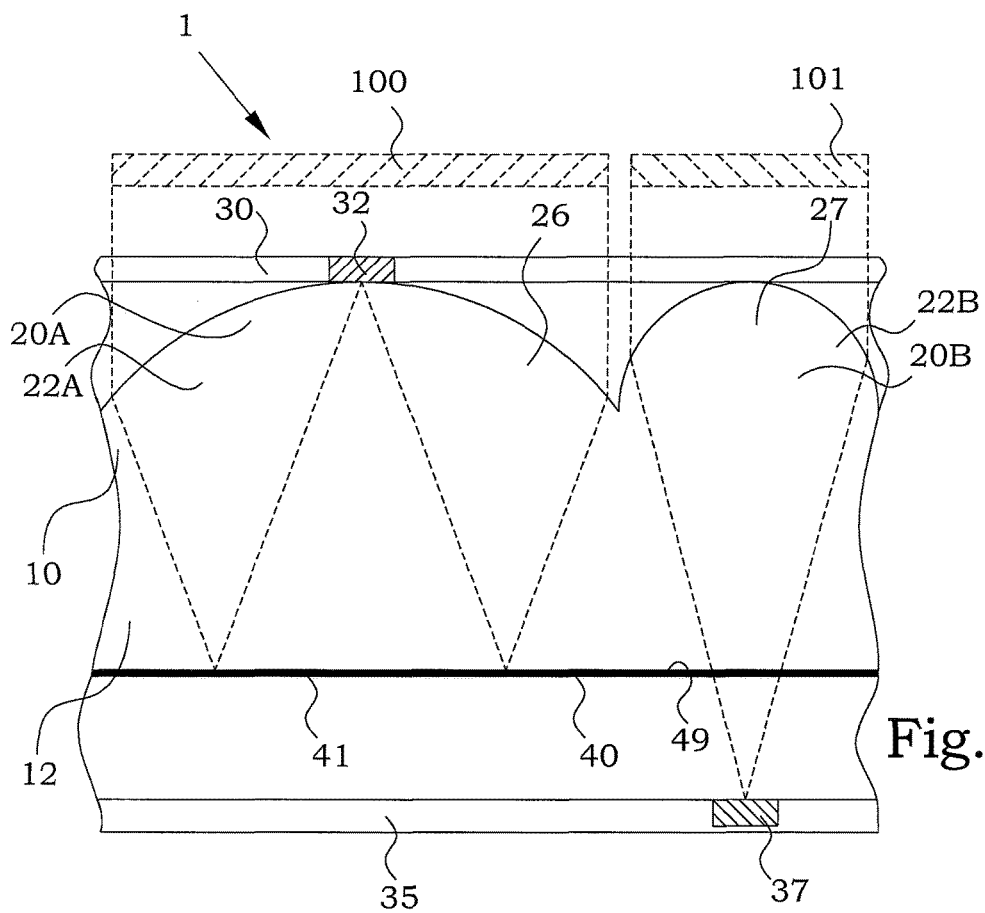
FIG. 18 is a schematic drawing of an embodiment of an integral image device with micro-lenses of different focal lengths and a semitransparent reflecting layer.

FIG. 18 illustrates another embodiment of an integral image device 1 with micro-lenses of differing focal length. In this embodiment, the reflecting layer is a semitransmitting reflective layer 41, and the additional image fragment plane 35 is situated behind the semitransmitting reflective layer 41, i.e. the semitransmitting reflective layer 41 is positioned between the additional image fragment plane 35 and the image fragment plane 30.

Figures 19A, 19B:
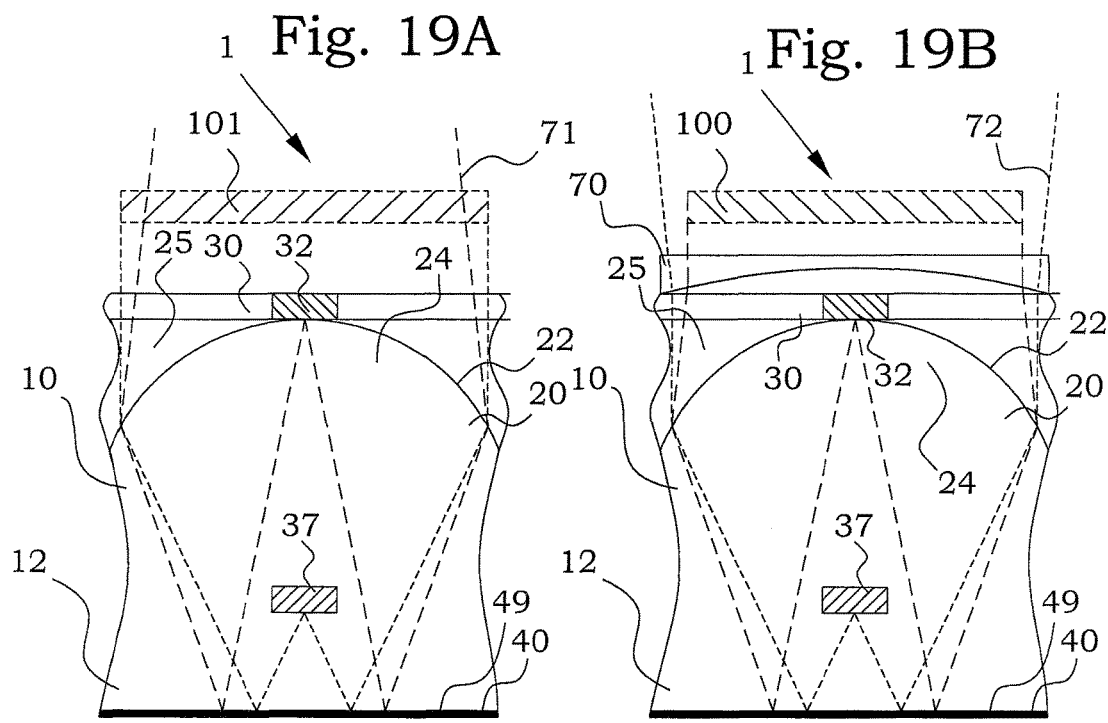
FIGS. 19A-B are schematic drawings of embodiments of an integral image device with two image fragment planes.

FIG. 19A illustrates one of the focusing micro-lenses 22 of an embodiment of an integral image device 1 having two image fragment planes. The focusing micro-lens 22 is adapted to have a focal length allowing imaging of the image fragment structure 37. The image fragment structure 37 can, as also discussed above, be placed anywhere within the integral image device 1 if the focal length of the focusing micro-lenses 22 adapted thereto. The image fragment structure 32 on top of the focusing micro-lenses 22, however is positioned outside the focus of the focusing micro-lenses 22, and will therefore not give rise to any integral image, as illustrated by the converging rays 71.

In FIG. 19B, an additional lens 70 has been provided on top of the integral image device 1. This additional lens 70 changes the optical situation, and the image fragment structure 32 on top of the focusing micro-lenses 22 now give rise to an integral image 100, while rays from the image fragment structure 37 give diverging rays 72, which not will give any integral image. This property can be advantage be used for authentication purposes, where an integral image device shows one integral image when viewed as such, but when a verifying lens array temporarily is placed to cover the integral image device, another integral image appears.

Another embodiment of an integral image device 1 is illustrated in FIG. 20A. An array 24 of convex micro-lenses is provided. The micro-lenses in this array are adapted to have a focal length being essentially equal to the thickness of the integral image device 1. The array 24 of convex micro-lenses thus gives rise to an integral image based on the additional image fragment structures 37. The image fragment structures 32 of the image fragment plane 30 on top of the array 24 of convex micro-lenses does not give any image.

In FIG. 20B, the integral image device 1 is immersed into a liquid 25, which fills e.g. the cavities of the array 24 of convex micro-lenses. The result is that the array 20 of focusing micro-lenses now comprises embedded micro-lenses. Due to the difference in refractive index between air and the liquid 25, the focal length of the array 24 of convex micro-lenses changes. The focal length now approximately corresponds to twice the thickness of the integral image device 1. The image fragment structures 32 of the image fragment plane 30 on top of the array 24 of convex micro-lenses do now give rise to an integral image, while the additional image fragment structures 37 do not.

In FIGS. 20C and 20D, similar situations are illustrated for an integral image device 1 with the image fragment structures 32 of the image fragment plane 30 below the array 24 of convex micro-lenses.

FIG. 21A illustrates an embodiment of an integral image device 1. The upper part of the integral image device 1 resembles the embodiments discussed further above. However, the reflective layer 40 comprises in this embodiment a number of reflective sections 47. Each reflective section 47 is tilted around an axis parallel to a main surface of the integral image device 1. This results in that the normal of the reflective section 47 is directed in a direction 51 that is not perpendicular to the main surface of the integral image device 1. The light rays that have been reflected in the reflective section 47 and leave the integral image device 1 in a perpendicular direction with respect to the main surface have their origin in light rays impinging on the reflective section 47 in a direction that is not perpendicular to the main surface. As will be described below, this may have advantages under certain conditions. In the present embodiment, the sectioning of the reflective sections 47 is in registry with the array 20 of focusing micro-lenses, i.e. each focusing micro-lens corresponds to one of the reflective sections 47. In other embodiment, other divisions of the reflective sections 47 are applied. In fact the pitch, size, shape or packing structure of the reflective section 47 is of no relevance to its function serving as a mirror in this embodiment. However, one could as well design the pitch, size and shape of the reflective section 47 to fit with the packing structure of the focusing elements 20 and hence create an additional integral image magnifying the edges of the reflective section 47 as an overlapping image to the one emanating from the image fragment structures 32.

One result of the tilted reflective sections is that the image that is seen when the optical device is viewed from a perpendicular direction does not emanate from the center, with respect to the corresponding focusing micro-lens, of the image fragment plane 30, but from an offset position, positioned a distance 53 from the center In order to evaluate the advantages with an embodiment as the one illustrated in FIG. 21A, one should be aware of that the image that is viewed by the viewer is composed of light that has passed the optical device without being fully extinguished. If the image fragment structure 32 are at least partially transparent, some light may pass and may e.g. give rise to different colored or shaded images. If the image fragment structure 32 is opaque, no light will pass the image fragment structure 32. The integral image seen by a viewer will therefore in the corresponding position experience a lack of light. The contours of a dark integral image and the color a colored integral image are therefore improved by a high light intensity impinging onto the integral image device. Unfortunately, the head of a viewer viewing the integral image device in a perpendicular direction relative the surface of the integral image device will screen off a substantial amount of light that would be useful for creating a sharp integral image. In other words, the head may partially shade the integral image. By instead letting the light that impinges onto the integral image device with an angle with respect to the surface normal give rise to the integral image, a higher light intensity is achieved. This is achieved by an integral image device according to FIG. 21B. An improvement is assumed to appear gradually when increasing the impinging angle. As an example, with a typical viewing distance of 0.2-0.6 m and a head diameter of 0.13-0.23 m, impinging angles of 6-35° would be sufficient to avoid the head. In a preferred embodiment, the tilting of the reflective sections 47 is in the interval of 5-35°, more preferably in the interval 7-20°, and most preferably around 10°.

In FIG. 21A, the image fragment plane 30 is provided on top of the array 20 of focusing micro-lenses 22, which gives an extremely thin device. However, the approach of using tilted reflective sections 47, can also be applied to other designs. One such design is illustrated in FIG. 21B, where the image fragment plane 30 is provided below the array 20 of focusing micro-lenses 22.

In the embodiments illustrated above, the array of micro-lenses has been illustrated as being a part of a distancing structure between the array of micro-lenses and the reflecting layer. However, as is well known also in prior art, it is also possible to provide the array of micro-lenses in a narrower layer, which is adhered to an optical spacer, determining the total distance to the reflecting layer. All the embodiments above are thus also possible to be implemented by using two or more layers, together forming the layer of the array of micro-lenses and the distance volume to the reflecting layer. These layers can be manufactured by any at least partly transparent material. These layers can furthermore be permanently or non-permanently attached to each other.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. An integral image device, comprising:
   an array of focusing micro-lenses, causing refraction of light through said focusing micro-lenses;
   said array of focusing micro-lenses having a focal plane; and
   an image fragment plane with image fragment structures;
   said image fragment plane being positioned on an opposite side of said array of focusing micro-lenses with respect to said focal plane;
   wherein said image fragment plane is arranged to, when being viewed refracted through said array of focusing micro-lenses away from a viewer, reflected and refracted back through said array of focusing micro-lenses towards said viewer, give rise to an integral image.

2. The integral image device according to claim 1, wherein said array of focusing micro-lenses is an array of embedded focusing micro-lenses.

3. The integral image device according to claim 1, further comprising:
   a reflecting layer, positioned on a same side of said array of focusing micro-lenses as said focal plane;
   said reflecting layer being arranged for reflecting at least a part of light incident on a surface of said reflecting layer facing said array of focusing micro-lenses; and
   whereby said array of focusing micro-lenses is positioned between said reflecting layer and said image fragment plane;
   wherein said image fragment plane is arranged to, when being viewed refracted through said array of focusing micro-lenses towards said reflecting layer, reflected by said reflecting layer and refracted back through said array of focusing micro-lenses from said reflecting layer, give rise to an integral image.

4. The integral image device according to claim 3, wherein reflective portions of said reflecting layer are concavely curved, said reflective portions being arranged in an array that is laterally aligned with said array of focusing micro-lenses.

5. The integral image device according to claim 1, wherein said reflecting layer is arranged for transmitting at least a part of light incident on a surface of said reflecting layer facing away from said array of focusing micro-lenses.

6. The integral image device according to claim 5, further comprising:
   an additional image fragment plane;
   said reflecting layer being positioned between said image fragment plane and said additional image fragment plane;
   wherein said additional image fragment plane is arranged to, when being viewed through said reflecting layer and through said array of focusing micro-lenses, give rise to an additional integral image.

7. The integral image device according to claim 6, further comprising:
   an additional array of focusing micro-lenses;
   said additional array of focusing micro-lenses is positioned between said reflecting layer and said additional image fragment plane;
   said reflecting layer being additionally arranged for reflecting at least a part of light incident on a surface of said reflecting layer facing said additional array of focusing micro-lenses;
   wherein said additional image fragment plane is arranged to, when being viewed via said reflecting layer and through said additional array of focusing micro-lenses, give rise to an opposite side integral image;
   wherein said image fragment plane is arranged to, when being viewed through said reflecting layer and through said additional array of focusing micro-lenses, give rise to an additional opposite side integral image.

8. The integral image device according to claim 5, wherein said reflecting layer has thickness allowing said at least a part of said light to be transmitted is transmitted through said reflecting layer.

9. The integral image device according to claim 5, wherein said reflecting layer is perforated with perforations allowing said at least a part of said light to be transmitted is transmitted through said perforations, and wherein said at least a part of said light to be reflected is reflected on areas between said perforations.

10. The integral image device according to claim 9, wherein said perforations and said areas between said perforations are provided in a regularly repeated pattern, said regularly repeated pattern has a pitch that differs from a pitch of said focusing micro-lenses by a small fraction, and in that said perforations or said areas between said perforations are formed in a simple geometrical shape.

11. A method for manufacturing an integral image device, comprising the steps of:
   providing a thin, at least partly optically transmissive, substrate;
   creating an array of focusing micro-lenses at a first surface of said substrate that cause refraction of light through said focusing micro-lenses; and
   providing an image fragment plane with image fragment structures on top of said array of focusing micro-lenses;
   wherein said step of providing said image fragment plane comprises arranging said image fragment plane with image fragment structures to, when being viewed refracted through said array of focusing micro-lenses away from a viewer, reflected and refracted back through said array of focusing micro-lenses towards said viewer, give rise to an integral image.

12. The method according to claim 11, wherein said step of creating an array of focusing micro-lenses comprises the steps of:
creating an array of curved surfaces between a first transmissive material, having a first refraction index, and a surrounding gas, at said first surface of said substrate; and
filling interstices between or within said curved surfaces by a second transmissive material, having a second refraction index, different from said first refraction index, creating a planar outer surface.

13. The method according to claim 11, comprising the further step of:
forming a reflecting layer at a second surface of said substrate, opposite to said first surface, for reflecting at least a part of light incident on a surface of said reflecting layer facing said array of focusing micro-lenses;
wherein said step of providing said image fragment plane comprises arranging said image fragment plane with image fragment structures to, when being viewed refracted through said array of focusing micro-lenses towards said reflecting layer, reflected by said reflecting layer and refracted back through said array of focusing micro-lenses from said reflecting layer, give rise to an integral image.

14. The method according to claim 13, wherein said step of forming a reflecting layer comprises the steps of:
creating an array of convex curved surfaces at said second surface of said substrate; and
covering said array of convex curved surfaces at said second surface with said reflecting layer;
wherein one of said step of creating said array of convex curved surfaces at said second surface and said step of creating said array of focusing micro-lenses at said first surface comprises the step of laterally aligning said array of convex curved surfaces at said second surface with said array of focusing micro-lenses at said first surface.

15. The method according to claim 11, wherein said step of forming a reflecting layer at said second surface comprises forming a reflecting layer transmitting at least a part of light incident on said surface of said reflecting layer facing away from said array of focusing micro-lenses.

16. The method according to claim 15, comprising the further steps of:
providing an additional image fragment plane so that said reflecting layer becomes positioned between said image fragment plane and said additional image fragment plane;
wherein said step of providing said additional image fragment plane comprises arranging said additional image fragment plane with image fragment structures to, when being viewed through said reflecting layer and through said array of focusing micro-lenses, gives rise to an additional integral image.

17. The method according to claim 16, comprising the further steps of:
providing a thin, at least partly optically transmissive, additional substrate;
creating an additional array of focusing micro-lenses at a first surface of said additional substrate;
wherein said step of providing an additional image fragment plane comprises providing of an image fragment plane with image fragment structures on top of said additional array of focusing micro-lenses; and
forming a partly transmissive reflecting layer between said substrate and said additional substrate;
said step of forming a partly transmissive reflecting layer comprising said step of forming a reflecting layer at a second surface of said substrate and a step of forming said reflecting layer also at a second surface of said additional substrate, said second surface of said additional substrate being opposite to said first surface of said additional substrate;
wherein said step of providing said additional image fragment plane comprises arranging said additional image fragment plane with image fragment structures to, when being viewed via said reflecting layer and through said additional array of focusing micro-lenses, give rise to an additional integral image;
wherein said step of providing said image fragment plane comprises arranging said image fragment plane with image fragment structures to, when being viewed through said reflecting layer and through said additional array of focusing micro-lenses, give rise to an additional integral image.

18. The method according to claim 15, wherein said step of forming a reflecting layer at a second surface of said substrate comprises forming of a reflecting layer with a thickness allowing said at least a part of said light to be transmitted is transmitted through said reflecting layer.

19. The method according to claim 15, wherein said step of forming a reflecting layer at a second surface of said substrate comprises forming of a reflecting layer perforated with perforations allowing said at least a part of said light to be transmitted is transmitted through said perforations, and wherein said at least a part of said light to be reflected is reflected on areas between said perforations.

20. The method according to claim 19, wherein said step of forming a reflecting layer perforated with perforations comprises providing of said perforations in a regularly repeated pattern.

* * * * *